US009639765B2

(12) United States Patent
Du et al.

(10) Patent No.: US 9,639,765 B2
(45) Date of Patent: May 2, 2017

(54) MULTI-STAGE LIVENESS DETERMINATION

(71) Applicant: QUALCOMM Incorporated, San Diego, CA (US)

(72) Inventors: Eliza Yingzi Du, Cupertino, CA (US); Ming Yu Chen, Santa Clara, CA (US); Esra Vural, Santa Clara, CA (US); Kwokleung Chan, Sunnyvale, CA (US); David William Burns, San Jose, CA (US); Suryaprakash Ganti, Los Altos, CA (US); John Keith Schneider, Williamsville, NY (US); Saurav Bandyopadhyay, Milpitas, CA (US); Jin Gu, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/845,149

(22) Filed: Sep. 3, 2015

(65) Prior Publication Data
US 2016/0070967 A1 Mar. 10, 2016

Related U.S. Application Data

(60) Provisional application No. 62/151,983, filed on Apr. 23, 2015, provisional application No. 62/046,744, filed on Sep. 5, 2014.

(51) Int. Cl.
*G06K 9/36* (2006.01)
*G06K 9/00* (2006.01)
(Continued)

(52) U.S. Cl.
CPC ......... *G06K 9/00906* (2013.01); *G06K 9/001* (2013.01); *G06K 9/0002* (2013.01);
(Continued)

(58) Field of Classification Search
CPC ........... G06K 9/00899; G06K 9/00906; G06K 9/00107; G06K 9/00114
See application file for complete search history.

(56) References Cited

U.S. PATENT DOCUMENTS 5,456,256 A * 10/1995 Schneider ............ A61B 5/1172
                                                            600/445
7,505,613 B2    3/2009 Russo
(Continued)

FOREIGN PATENT DOCUMENTS

EP       1835438 A1    9/2007
WO       0124700 A1    4/2001
(Continued)

OTHER PUBLICATIONS

Galbally et al., "A high performance fingerprint liveness detection method based on quality related features", 2010 Elsevier, 2 cover pages + pp. 311-321.*
(Continued)

*Primary Examiner* — Brian P Werner
(74) *Attorney, Agent, or Firm* — Weaver Austin Villeneuve & Sampson LLP

(57) ABSTRACT

A method of determining whether a biometric object is part of a live individual is described. In one such method, image information is acquired from the biometric object by using a sensor, such as an ultrasonic sensor. The image information may be analyzed in at least two analysis stages. One of the analysis stages may be a temporal analysis stage that analyzes changes in the image information obtained during a time period throughout which the biometric object was continuously available to the sensor. For example, a dead/alive stage may analyze differences between image information taken at two different times in order to identify changes from one time to the next. Other stages may focus on aspects of a particular image information set, rather than
(Continued)

seeking to assess changes over time. These other stages seek to determine whether an image information set exhibits characteristics similar to those of a live biometric object.

22 Claims, 18 Drawing Sheets

(51) Int. Cl.
 *G06T 7/32* (2017.01)
 *G06T 7/33* (2017.01)
 *G06T 7/44* (2017.01)

(52) U.S. Cl.
 CPC ..... *G06K 9/00093* (2013.01); *G06K 9/00107* (2013.01); *G06K 9/00114* (2013.01); *G06T 7/32* (2017.01); *G06T 7/337* (2017.01); *G06T 7/344* (2017.01); *G06T 7/44* (2017.01); *G06T 2207/10132* (2013.01); *G06T 2207/20064* (2013.01); *G06T 2207/20072* (2013.01)

(56) References Cited

U.S. PATENT DOCUMENTS

| | | | |
|---|---|---|---|
| 7,738,681 | B1 | 6/2010 | Rannow et al. |
| 7,804,984 | B2 | 9/2010 | Sidlauskas et al. |
| 2003/0202687 | A1 | 10/2003 | Hamid et al. |
| 2005/0084154 | A1 | 4/2005 | Li et al. |
| 2005/0259850 | A1 | 11/2005 | Shimamura et al. |
| 2007/0030475 | A1 | 2/2007 | Rowe et al. |
| 2007/0092115 | A1 | 4/2007 | Usher et al. |
| 2007/0230754 | A1 | 10/2007 | Jain et al. |
| 2008/0253625 | A1 | 10/2008 | Schuckers et al. |
| 2009/0316963 | A1 | 12/2009 | Boshra |
| 2010/0008552 | A1 | 1/2010 | Shin et al. |
| 2010/0113952 | A1 | 5/2010 | Raguin et al. |
| 2010/0251824 | A1 | 10/2010 | Schneider et al. |
| 2011/0158535 | A1 | 6/2011 | Iio et al. |
| 2012/0263355 | A1 | 10/2012 | Monden |
| 2013/0058544 | A1 | 3/2013 | Sayac et al. |
| 2013/0202182 | A1 | 8/2013 | Rowe |
| 2014/0226879 | A1 | 8/2014 | Westerman et al. |
| 2014/0241596 | A1 | 8/2014 | Chen et al. |
| 2016/0070968 | A1 | 3/2016 | Gu et al. |

FOREIGN PATENT DOCUMENTS

| | | |
|---|---|---|
| WO | 2006042144 A2 | 4/2006 |
| WO | 2014124167 A1 | 8/2014 |

OTHER PUBLICATIONS

Bossen et al., "Internal Fingerprint Identification With Optical Coherence Tomography", IEEE Photonics Technology Letters, vol. 22, No. 7, Apr. 1, 2010, pp. 507-509.*
Drahansky M., "Liveness Detection in Biometrics," Advanced Biometric Technologies, 2011, 21 pages.
Arulkumaran T., et al., "Fingerprint Based Age Estimation Using 2D Discrete Wavelet Transforms and Principal Component Analysis", International Journal of Advanced Research in Electrical Electronics and Instrumentation Engineering, Mar. 3, 2013 (Mar. 3, 2013), pp. 1060-1066, XP055227078, Retrieved from the Internet: URL: http://www/ijareeie.com/upload/march/14_Fingerprint %20Based.pdf [retrieved on Nov. 10, 2015].
International Search Report and Written Opinion—PCT/US2015/048583—ISA/EPO—Nov. 20, 2015.
Toth B, "Biometric Liveness Detection", Information Security Bulletin, CHI Publishing, Oct. 1, 2005, XP007906384, vol. 10, pp. 291-298.
Mela G., et al.,"Fingerprint Recognition Using Haar Wavelet Transform and Local Ridge Attributes Only," Jan. 31, 2014 (Jan. 31, 2014), XP055292736, Retrieved from the Internet: URL: http://www.ijarcsse.com/docs/papers/Volume_4/1_January2014/V4I1-0103.pdf [retrieved on Aug. 2, 2016].
Warwante B.G., et al., "Wavelet Based Fingerprint Liveness Detection", International Journal of Engineering Research and Applications (IJERA), ISSN: 2248-9622, vol. 2, No. 2, Mar.-Apr. 2012, pp. 1643-1645.
International Search Report and Written Opinion—PCT/US2015/048581—ISA/EPO—Nov. 23, 2015.
International Preliminary Report on Patentability—PCT/US2015/048583—ISA/EPO—Aug. 30, 2016.
International Prelimminary Report on Patentability—PCT/US2015/048581—ISA/EPO—Dec. 8, 2016.
U S Office Action dated Oct. 27, 2016, issued in U.S. Appl. No. 14/845,174.
U.S. Notice of Allowance dated Feb. 16, 2017, issued in U.S. Appl. No. 14/845,174.

\* cited by examiner

Fingerprint Images

Non-Fingerprint Images

MULTI-STAGE LIVENESS DETERMINATION

CROSS-REFERENCES TO RELATED APPLICATIONS

This application claims priority to U.S. Provisional Application No. 62/151,983, filed on Apr. 23, 2015, and U.S. Provisional Application No. 62/046,744, filed on Sep. 5, 2014, the disclosures of which are incorporated herein by reference. This application incorporates the disclosure of copending U.S. application Ser. No. 14/845,174 entitled "Image-Based Liveness Detection for Ultrasonic Fingerprints" filed concurrently herewith on Sep. 3, 2015 in its entirety.

FIELD OF THE DISCLOSURE

The present disclosure relates to devices and methods of determining liveness.

BACKGROUND OF THE DISCLOSURE

Biometric sensors are widely used to distinguish between individuals that are authorized to engage in an activity and individuals that are not authorized to engage in that activity. For example, fingerprint sensors are commonly used to determine whether a fingerprint provided by an individual matches information in a database, and if a match is determined, then the individual may be allowed to engage in an activity. For example, the individual may be allowed to enter a building or room, or allowed to use an electronic device such as a mobile phone or an application running on a mobile device.

Biometric sensors can be deceived (a.k.a. "spoofed"), and thereby permit an unauthorized individual to engage in an activity that is reserved for authorized individuals. Spoofing a fingerprint sensor may be accomplished in different ways. These include using a fake fingerprint, using body parts other than a finger, and using a dead finger from a person. Since it is unlikely that the particular type of spoofing to be used on a fingerprint sensor will be known in advance, it is important to guard against all types of spoofs. One method of guarding against spoofing involves determining whether the biometric object exhibits characteristics associated with liveness.

As more and more biometrics are used for user identification and/or verification, liveness detection becomes increasingly important in order to ensure access security and accuracy. Liveness detection is important because many methods of deceiving an identification system and/or verification system use spoofs that are not alive. For example, a latex finger may be made to have ridges and valleys resembling a fingerprint of an authorized user. When such a latex spoof is presented to a fingerprint sensor, the scanning system may falsely conclude that the latex spoof is the finger of an authorized user, even though the latex spoof is not part of a living being. Therefore, a system that is able to detect whether a biometric object is part of a live being would be useful in detecting the presence of a spoof. In such a system, if a determination is made that a biometric object is not part of a live individual, then the individual presenting the biometric object may be denied access (for example, access to a requested activity) even if the biometric information (such as a fingerprint) matches information in an associated identification/verification database.

SUMMARY OF THE DISCLOSURE

One implementation of this disclosure may be described as a method of determining whether a biometric object is part of a live individual. The method may include the step of acquiring image information from the biometric object using a sensor. Image information may be acquired using a platen on which the biometric object is placed. The sensor may be an ultrasonic sensor and a range gate of the sensor may be adjusted, for example, to determine whether the biometric object is comprised of layers. The sensor may also be configured to detect a plurality of ultrasonic frequencies, for example, to determine whether the biometric object is comprised of layers. The method may further include analyzing the image information in at least two analysis stages.

One of the analysis stages may be a temporal analysis stage that analyzes changes in the image information obtained during a time period throughout which the biometric object was continuously available to the sensor. The temporal analysis stage may determine whether changes in the image information are similar to changes consistent with a live object. The temporal analysis stage may determine whether a feature of the biometric object changed during the time period. Features may include pore opening size, pore depth, ridge pattern, and texture.

One of the analysis stages may analyze the image information to determine whether the biometric object is three-dimensional. Determining whether the biometric object is three-dimensional may include determining whether patterns of the biometric object are uniform. A Sobel filter may be used to determine whether patterns of the biometric object are uniform.

One of the analysis stages may analyze the image information to determine whether pattern types in the image information are among predetermined pattern types, for example, identifying pattern classifications presented in the image information, and then determining whether the pattern classifications are among predetermined pattern classifications. Identifying pattern classifications may include identifying whether patterns of the biometric object exhibit ridge flow.

One of the analysis stages may analyze the image information to determine whether the biometric object is manufactured, for example, by determining whether the biometric object is comprised of layers. The image information may also be analyzed to assess image quality of the image information in order to determine whether the biometric object is manufactured.

The method may further include the step of concluding that the biometric object is part of a live individual if the temporal analysis stage indicates that changes in the image information are similar to changes consistent with a live object and the other of the analysis stages indicates that the object is three-dimensional. A liveness output signal may be provided based on the analyzed image information. In some implementations, image-based liveness detection based on the analysis of image information from a single image may serve as one of the non-temporal analysis stages. In some implementations, image-based liveness detection based on the analysis of image information from two or more images may serve as a temporal analysis stage. In some implementations, intermediate decisions from each of a plurality of single images may be fused to form a composite decision.

One implementation of this disclosure may be described as a method of determining whether a biometric object is part of a live individual. The method may include acquiring image information from the biometric object using a sensor. The method may further include analyzing the image information. The analysis of the image information may include determining whether the biometric object is three-dimensional. The analysis of the image information may also include determining whether pattern types in the image information are among predetermined pattern types. The analysis of the image information may also include determining whether the biometric object is manufactured. The analysis of the image information may also include selecting a time period throughout which the biometric object was continuously available to the sensor, and determining whether the image information changed during the time period in a manner that is consistent with a live object. The method may further include concluding that the biometric object is part of a live individual if the biometric object is determined to be three-dimensional, the pattern types in the image information are among predetermined pattern types, the biometric object is determined to be not manufactured, and the biometric object is determined to behave in a manner that is consistent with a live object.

One implementation of this disclosure may be described as a non-transitory computer readable medium storing computer executable code. The executable code may include instructions to acquire image information from a biometric object using a sensor. The executable code may also include instructions to analyze the image information in at least two analysis stages. One of the analysis stages may be a temporal analysis stage having instructions to analyze changes in the image information obtained during a time period throughout which the biometric object was continuously available to the sensor.

One implementation of this disclosure may be described as a system for determining whether a biometric object is part of a live individual. The system may include a sensor configured to acquire image information from the biometric object. The sensor may be an ultrasonic sensor and a range gate of the sensor may be adjustable. The sensor may be configured to detect a plurality of ultrasonic frequencies. The sensor may also have a platen on which the biometric object is placed.

The system may also include a processor configured to analyze the image information in at least two analysis stages. One of the analysis stages may be a temporal analysis stage that analyzes changes in the image information acquired during a time period throughout which the biometric object was continuously available to the sensor. The processor may be configured to adjust the range gate of the sensor to determine whether the biometric object is comprised of layers.

One implementation of this disclosure may be described as a method of determining whether a biometric object is part of a live individual. In one such method, image information may be acquired from the biometric object using a sensor such as an ultrasonic sensor. The image information may be analyzed in one or more analysis stages. One of the analysis stages may attempt to determine whether the biometric object is alive or dead. The dead/alive stage may acquire image information sets gathered at two different times and then analyze differences between the acquired image information in order to identify changes from one time to the next. Since the dead/alive stage seeks to identify and assess changes over time, the dead/alive stage is sometimes referred to herein as a "temporal analysis stage." Stages other than the dead/alive stage may focus on aspects of a particular image information set acquired at a particular time, rather than seeking to assess changes over time. The non-temporal stages may seek to determine whether an image information set exhibits characteristics that are similar to those consistent with a live biometric object. A non-temporal stage may be referred to herein as an "EBS," which stands for "expected biometric stage."

If either the temporal analysis stage indicates the biometric object is dead or an EBS indicates the biometric object is not in keeping with expectations, then access or an activity being requested may be denied. However, if the temporal analysis stage indicates that the biometric object is alive and all of the EBS are in keeping with expectations, then access or an activity being requested may be allowed.

The temporal analysis stage may determine whether changes in the image information are similar to changes consistent with a live object. Such an analysis may determine whether a particular feature of the biometric object changed during the time period. For example, the feature might include a pore opening size, a pore depth, a pore feature, a ridge pattern, a ridge width, a fluidic emission, a local texture, a structural feature, a biometric feature or a biometric change. In order to improve the security of the method, the temporal analysis stage may analyze changes in the image information obtained during a time period throughout which the biometric object was continuously available to the sensor.

One or more expected biometric stages may be included. One such EBS may seek to determine whether the biometric object is two-dimensional or three-dimensional. A method for doing so may include determining whether patterns of the biometric object are uniform. If it is determined that the patterns are uniform, it may be determined that the object is two-dimensional and likely a spoof, and access or a requested activity may be denied. For example, the edges of fingerprint ridges in an acquired image may be exceedingly well-defined, indicating the possibility of a largely planar two-dimensional spoof such as a printed photo replica of a fingerprint. Alternatively, the method may determine whether image features such as fingerprint ridges and valleys are three-dimensional by evaluating, for example, the curvature change at the edge of a ridge as positioned on a platen of a sensor array.

Another type of EBS may analyze the image information to determine whether pattern types in the image information are among predetermined pattern types. Such a method may seek to classify patterns presented in the image information, and then determine whether the identified pattern classifications are among predetermined pattern classifications previously determined to be those corresponding to an acceptable biometric object, such as a live finger. One such classification may pertain to patterns that exhibit ridge flow. If the pattern type exhibited by the image information is a type that exhibits ridge flow, then a determination may be made that the object may be a finger, as opposed to a different body part (e.g. a nose, cheek, palm, or elbow).

Another type of EBS may analyze the image information to determine whether the biometric object is manufactured. Since manufactured objects often have layers, in one such EBS for identifying manufactured spoofs, a determination may be made regarding whether the biometric object is comprised of layers. For example, a thin latex sleeve having fingerprint ridges and valleys that is slid over a finger of an unauthorized person may be detectable by the EBS as having layers present in a spoof Layers within the target object may be detected using an ultrasonic sensor and capturing image information using various range-gate delays and/or a plurality of ultrasonic frequencies. In some implementations, intermediate decisions from one or more image-based liveness detection analyses may be used to determine whether the object is manufactured. Alternatively, manufactured spoofs may be formed from a solid single material such as a silicone polymer injected into a mold of a finger. Single-material spoofed fingers may have no internal layers unlike the layers of skin, bone and blood vessels in a human finger, and an EBS analyzing the presence of layers (or lack thereof) may determine that the single-material spoof is not live.

BRIEF DESCRIPTION OF THE DRAWINGS

For a fuller understanding of the nature and objects of the disclosure, reference should be made to the accompanying drawings and the subsequent description. Briefly, the drawings are.

FURTHER DESCRIPTION OF THE DISCLOSURE

Among many modalities of biometrics, fingerprints are one of the most studied and used. The implementations described herein focus on fingerprints, but the disclosure is not limited to fingerprints. For example, the disclosed systems and methods may be used with other biometrics, such as palmprint or handprint recognition.

Figure 1:
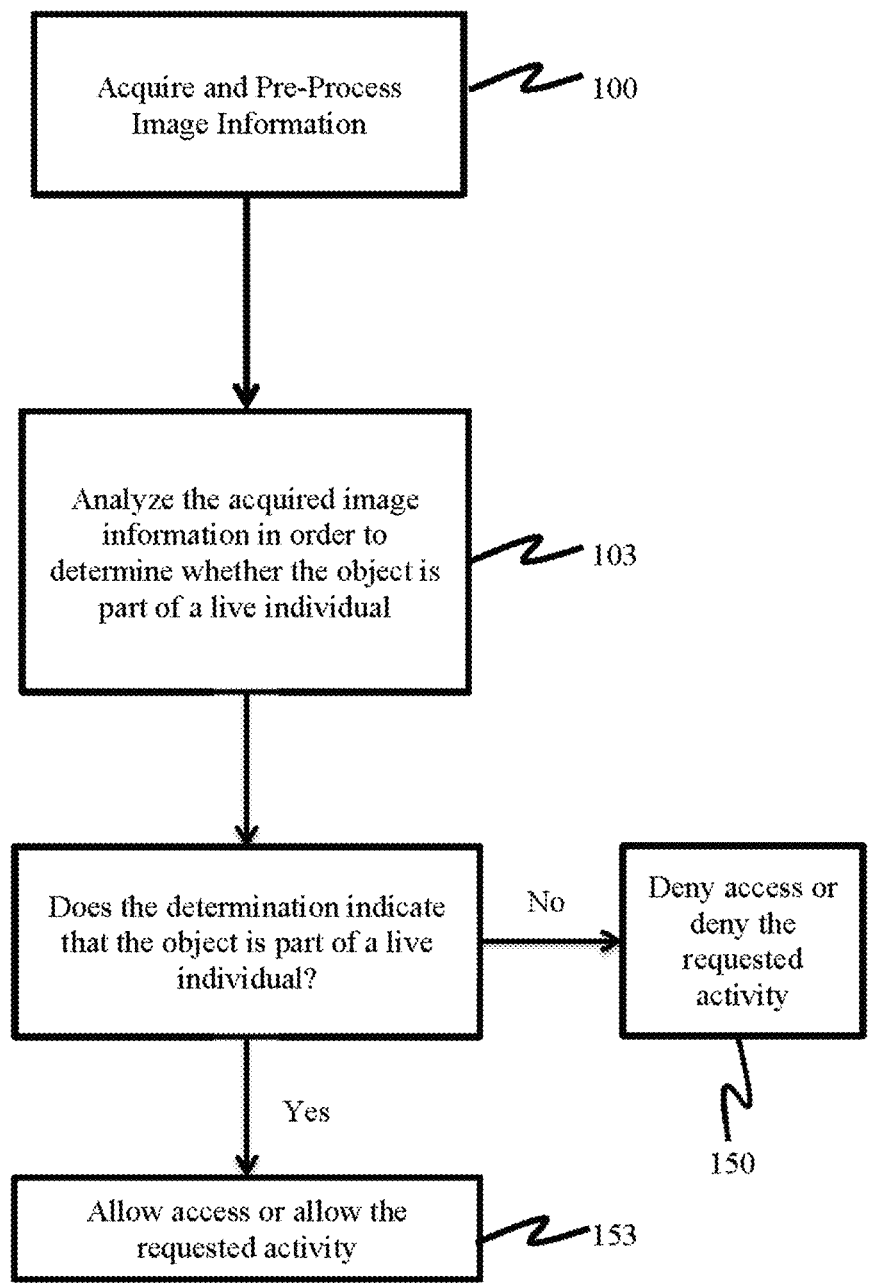
FIG. 1 is a flow diagram illustrating a method of determining liveness.

FIG. 1 is a flow diagram depicting a method of determining liveness. Image information about an object may be acquired 100 and analyzed 103 in order to determine whether the object is part of a live individual. The image information used to determine liveness may be the same information used to generate an image of the object. For example, the image information may be information about a fingerprint that was acquired 100 using an ultrasonic sensor, such as described in U.S. Pat. No. 7,739,912 entitled "Ultrasonic Fingerprint Scanning Utilizing a Plane Wave." Analysis of the image information may be carried out by one or more multipurpose computers or processors that have been programmed to analyze the image information, such as one or more applications processors of a mobile device. The acquired image information or data may be pre-processed as needed, for example, to reduce noise, increase contrast, remove artifacts, or compensate for temperature effects. If the analysis 103 of the image information indicates that the biometric object is not part of a live individual, then an activity requested (including activities that are merely desired such as access to an application or authorization of a purchase) by the individual may be denied 150. For example, if the individual requests access to a facility, computer database or mobile device application and the information analysis indicates that the biometric object was not part of a live individual, then the individual may not be permitted to gain access to the facility, database or application, as the case may be. However, if analysis of the image information indicates that the biometric object is part of a live individual, then the individual may be allowed 153 to gain access to the facility, database or application, as the case may be. In some implementations, identification, verification or authentication of the user may be required in addition to an indication of liveness before access may be granted or a requested activity is allowed.

Figure 2:
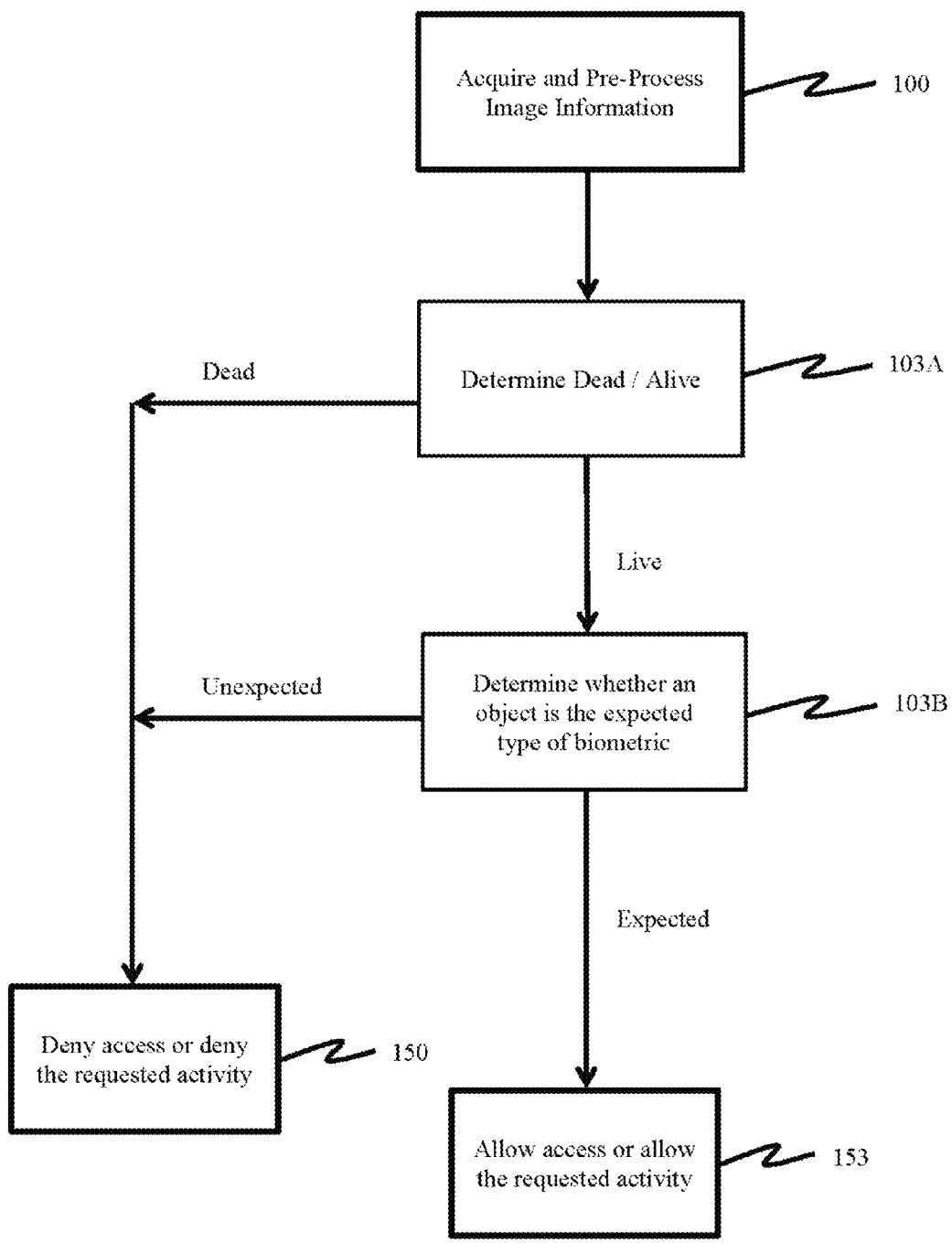
FIG. 2 is a flow diagram illustrating a method of determining liveness in which the analysis stages are carried out serially.
Figure 3:
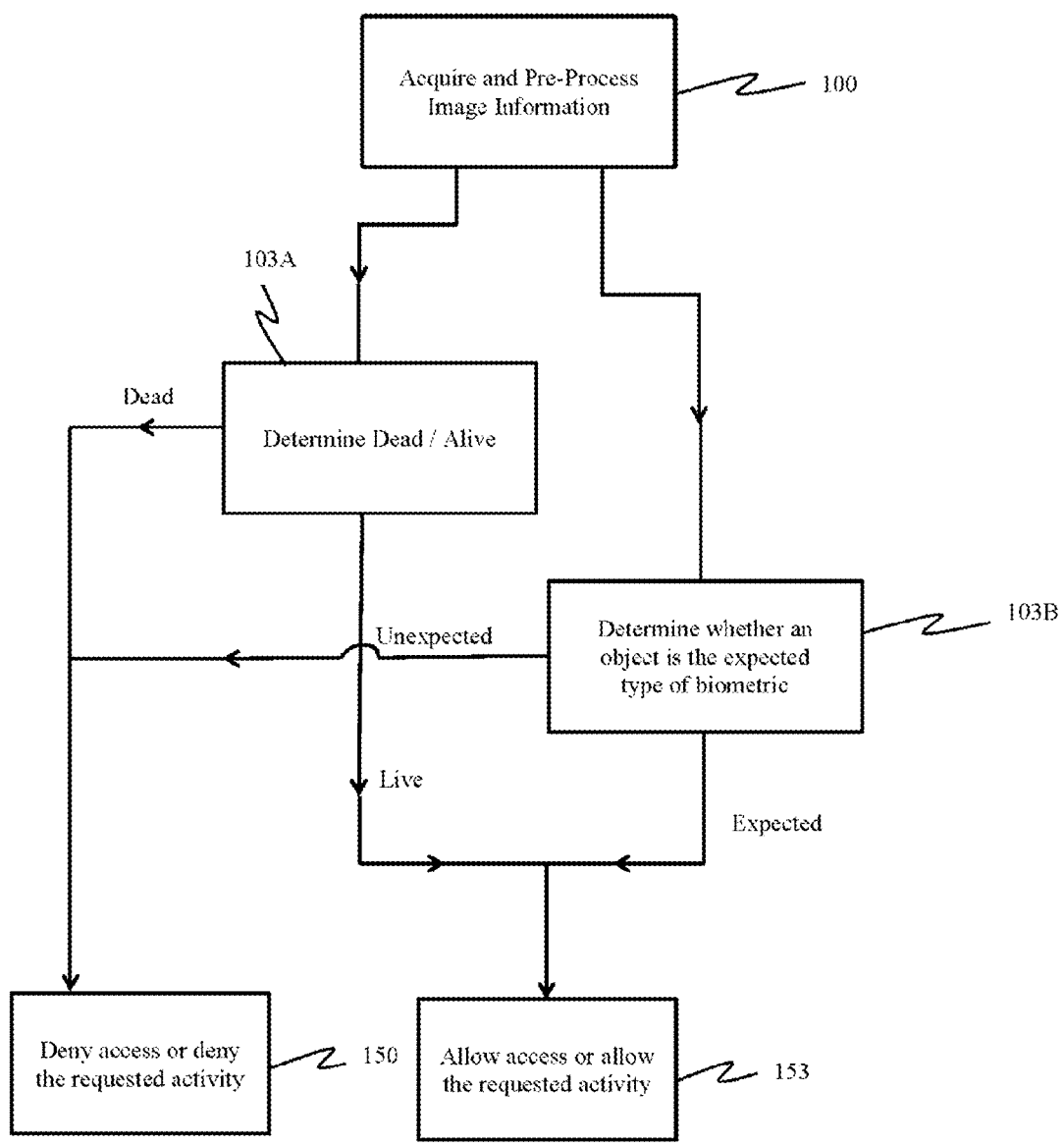
FIG. 3 is a flow diagram illustrating a method of determining liveness in which the analysis stages are carried out in parallel.

Analysis 103 of the image information to determine whether the object is part of a live individual may be carried out via two or more analysis stages. The analysis stages may be conducted in parallel (i.e. one stage is conducted while another stage is conducted), or serially (i.e. one stage after the other). FIG. 2 is a flow diagram illustrating a method of determining liveness in which the analysis stages 103A, 103B are carried out serially. FIG. 3 is similar to FIG. 2, except that the analysis stages 103A, 103B are carried out in parallel.

With regard to FIGS. 2 and 3, one of the analysis stages 103A may seek to determine whether the biometric object is dead or alive. One manner of making the dead/alive determination 103A is to identify and evaluate changes in the image information with respect to time. In one such analysis, at least two sets of image information or data about an object are acquired and compared to each other. For example, collected image information may be obtained by acquiring image information or information from a biometric object such as a finger, using an ultrasonic sensor array. A first set of image information obtained by acquiring image information at a first time may be compared to a second set of image information obtained by acquiring image information at a second time, and changes between the two information sets may be identified. Since the information sets are obtained at different times, this analysis stage seeks to identify changes occurring between two time periods, and may therefore be referred to as a "temporal analysis stage." If the temporal analysis stage identifies changes that are similar to changes consistent with a live object, then it may be concluded that the temporal analysis stage indicates that the biometric object is part of a live individual. It should be noted that the dead/alive stage may seek to produce a determination regarding whether a feature of the object changed during a time period throughout which the object was continuously available to the sensor. For example, as described in FIG. 6A, a time period may be selected 104 in which the object was continuously available to the sensor. In this manner, some assurance is provided that the temporal analysis is conducted with respect to the same biometric object. That is to say that the method/system may be implemented so as to prevent the use of two different biometric objects. For example, to prevent the use of two different biometric objects at two different times, a series of sequential images may be acquired from a biometric object such as a finger positioned on a surface of a platen coupled to an ultrasonic sensor array, with a sufficient number of sequential images acquired to determine that the same finger has been retained on the platen surface during the time period between the acquisition of the image information sets to be used for the temporal analysis. In some implementations, sequentially acquired data sets may be analyzed with a simpler analysis routine to ensure that a finger or other biometric object has not been removed from the platen surface. In some implementations, the temporal analysis may be carried out more than one time with the same finger. In some implementations, the temporal analysis may use more than two sets of image information. Sequentially acquired data sets to ensure that a biometric object has not been removed and replaced by another may be injected between the acquisitions of any of the temporal data sets.

The temporal analysis stage may analyze image information sets or image information for changes such as changes in pore size or changes in ridge patterns, particularly those that are indicative of an object having a pulse or other biological functionality such as sweating, emission of skin oils, or muscle movement. Other changes that may be detected as part of the temporal analysis stage include changes in pore depth or changes in texture. Pore sizes may change with time due to the emission of oil or sweat, or simply due to fluctuations in external pore diameter as a finger is pressed against a platen surface. Ridge patterns such as the position of ridges, the width of the ridges, or the ratio of ridge width to valley width may change as a finger is pressed and held against the platen surface, particularly as blood pressure changes in the fingertip with beating of a heart or as local contractions and relaxations of muscles occur in the depressed finger. Changes in texture may occur over short time intervals as the finger is pressed harder and softer against the platen surface, resulting in more and less skin area contacting the platen. For example, open pores having an incomplete ridge around the pore opening may become a closed pore as higher finger pressure is applied. The pore depth may change with time and pressure, as indicated by changes in the pore diameter against the platen surface. Temporal imaging with varying range-gate delays may allow imaging into the finger from which temporal changes such as pore diameter or pore depth may be detected.

If, from the temporal analysis, a determination is made that changes in the image information have occurred, then the temporal analysis stage may include determining whether the changes in the image information are similar to changes consistent with a live object. If it is determined by the temporal analysis that the changes are in keeping with those consistent with a live object, then the temporal analysis stage may produce an indication that the biometric object is likely part of a live individual. However, if it is determined by the temporal analysis that the changes are not in keeping with those consistent with a live object, then the temporal analysis stage may produce an indication that the biometric object is likely not part of a live individual.

In addition to the dead/alive stage 103A, there may be at least one other analysis stage 103B. In order to more clearly distinguish the analysis stages 103B from the dead/alive stage 103A, the analysis stages 103B may be one example of EBS. One or more EBS 103B may be combined with the dead/alive stage 103A to provide a method/system that is well suited to determining whether a biometric object is part of a live individual. During the EBS 103B, an analysis of the acquired information may be directed at determining whether the object is three-dimensional, whether pattern types in the image information are among predetermined pattern types, and/or whether the object is manufactured. Each of these analyses is described in further detail below. If the dead/alive stage 103A and the EBS 103B each produce a determination that the biometric object is part of a live individual, then a system or a method disclosed herein may produce an indication that the biometric object was part of a live individual at the time the image information was acquired. However, if either the dead/alive stage 103A or the EBS 103B produce an indication that the biometric object is not part of a live individual, then a system or a method disclosed herein may produce an indication that the biometric object is not part of a live individual. If the system/method produces an indication that the biometric object is likely part of a live individual, then information obtained from the biometric object may be analyzed in order to determine whether the individual who presented the biometric object may be authorized to engage in the requested activity. In some implementations, identification, verification or authentication of the user may be required in addition to a positive indication of liveness before access may be granted or the requested activity allowed.

Figure 4:
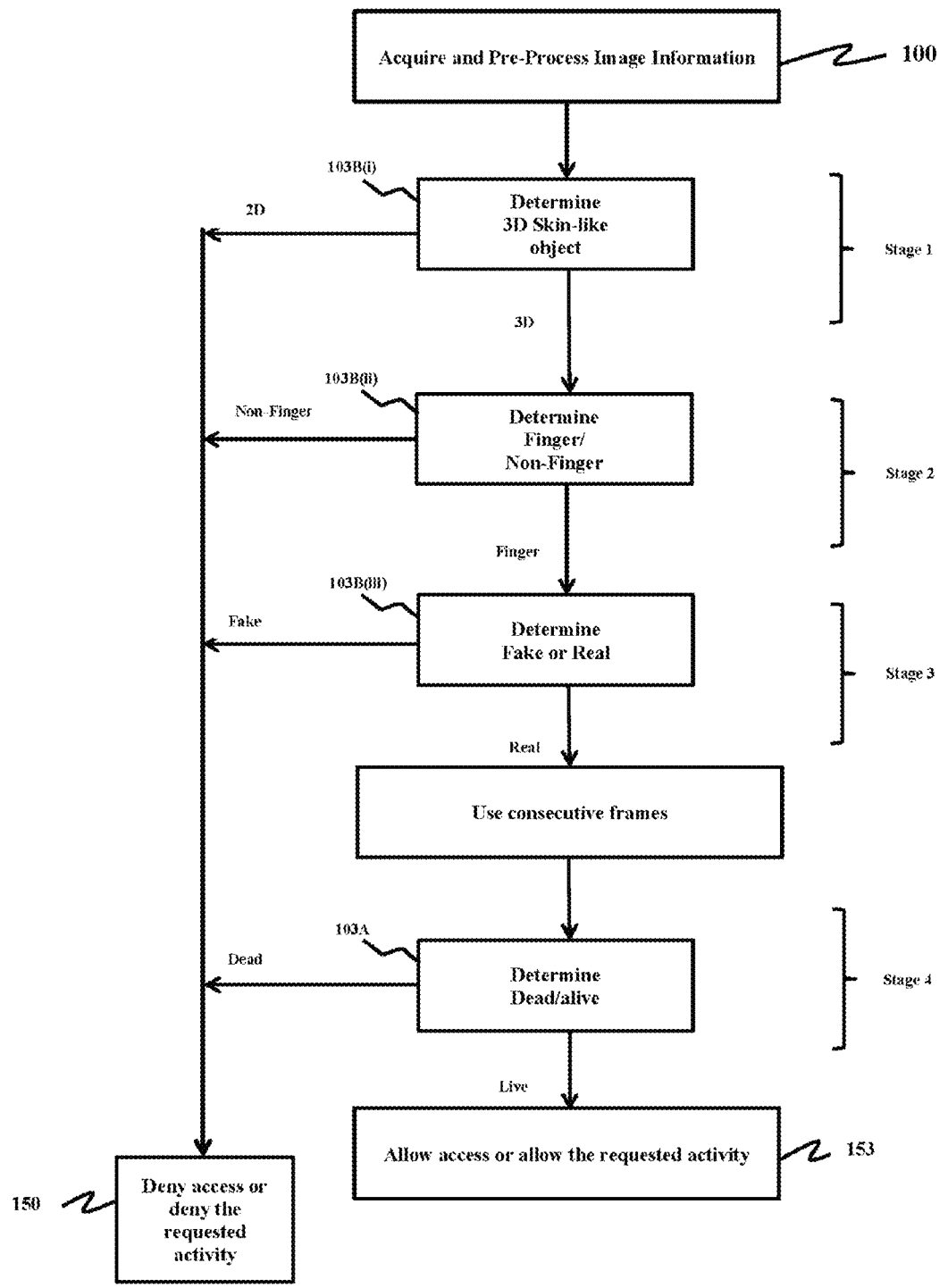
FIG. 4 is a flow diagram illustrating a method of determining liveness having four analysis stages.
Figure 5:
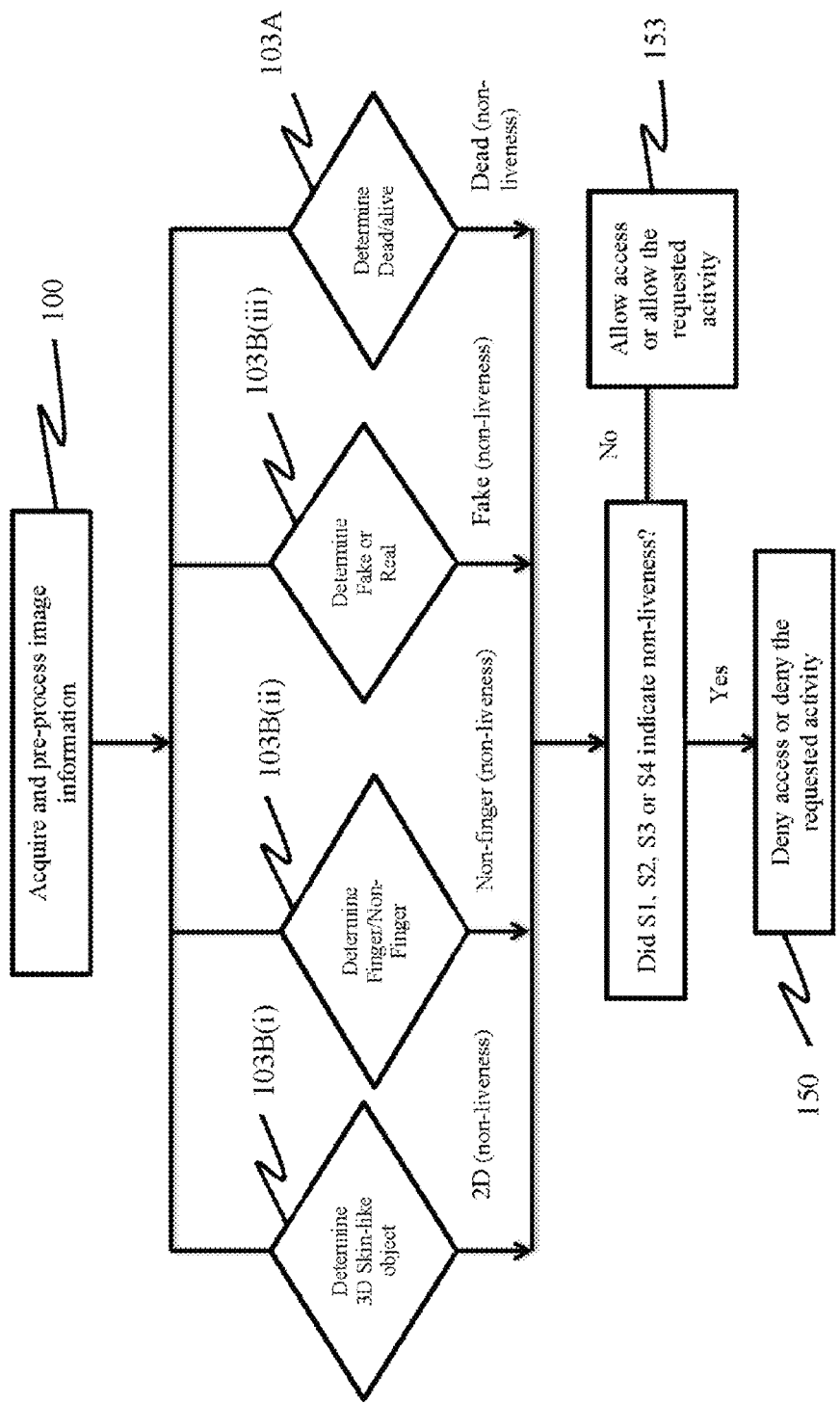
FIG. 5 is a flow diagram illustrating another method of determining liveness having four analysis stages.

Having provided a general overview of a method for determining liveness, we provide additional details below. FIG. 4 is a flow diagram illustrating a method of determining liveness having four analysis stages, which are (like FIG. 2) shown being carried out serially. Unlike FIG. 2, in FIG. 4 the dead/alive stage 103A is shown being carried out after the EBS 103B. FIG. 5 depicts a method similar to FIG. 4, except that the analysis stages are shown being executed in parallel. Serial execution of the analysis stages may yield certain benefits, particularly when one of the analysis stages requires less effort, requires less time, or is less costly computationally than others of the analysis stages. For example, if such an analysis stage requires less effort, requires less time, or is less costly than others of the analysis stages, it may be beneficial to execute that stage before other stages because an indication from such a stage that the object is not live may be used to preempt execution of the other stages, and thereby save time and energy. Alternatively, parallel execution of the analysis stages may yield various benefits, such as faster overall execution time, decreased latency, a better user experience, and more confidence in the liveness determination with the execution of all biometric analysis stages in the method.

FIG. 4 indicates that if it is determined by the EBS 103B that the image information is not correlated with an expected biometric object, then the EBS 103B may produce an indication that the presented biometric object is likely not part of a live individual. And, in that case, the method may produce an indication that the individual should not be allowed access or to engage in the requested activity, and the requested activity or access may be denied 150. If each EBS substage 103B(i)-(iii) indicates that the image information is correlated with an expected biometric, then the analysis may proceed to the dead/alive stage 103A. If the dead/alive stage 103A determines that the object that provided the information is not alive, then the EBS 103B may produce an indication that the presented biometric object is likely not part of a live individual. However, if it is determined by each EBS substage 103B(i)-(iii) and determined by the dead/alive stage 103A that the presented biometric object is part of a live individual, then an indication may be produced that the biometric object is likely part of a live individual. And, in that case, the method may produce an indication that the individual should be allowed access or to engage in the requested activity and the requested activity or access may be allowed 153. In some implementations, identification, verification or authentication of the user may be required in addition to an indication of liveness before access may be granted or a requested activity is allowed.

Figure 6A:
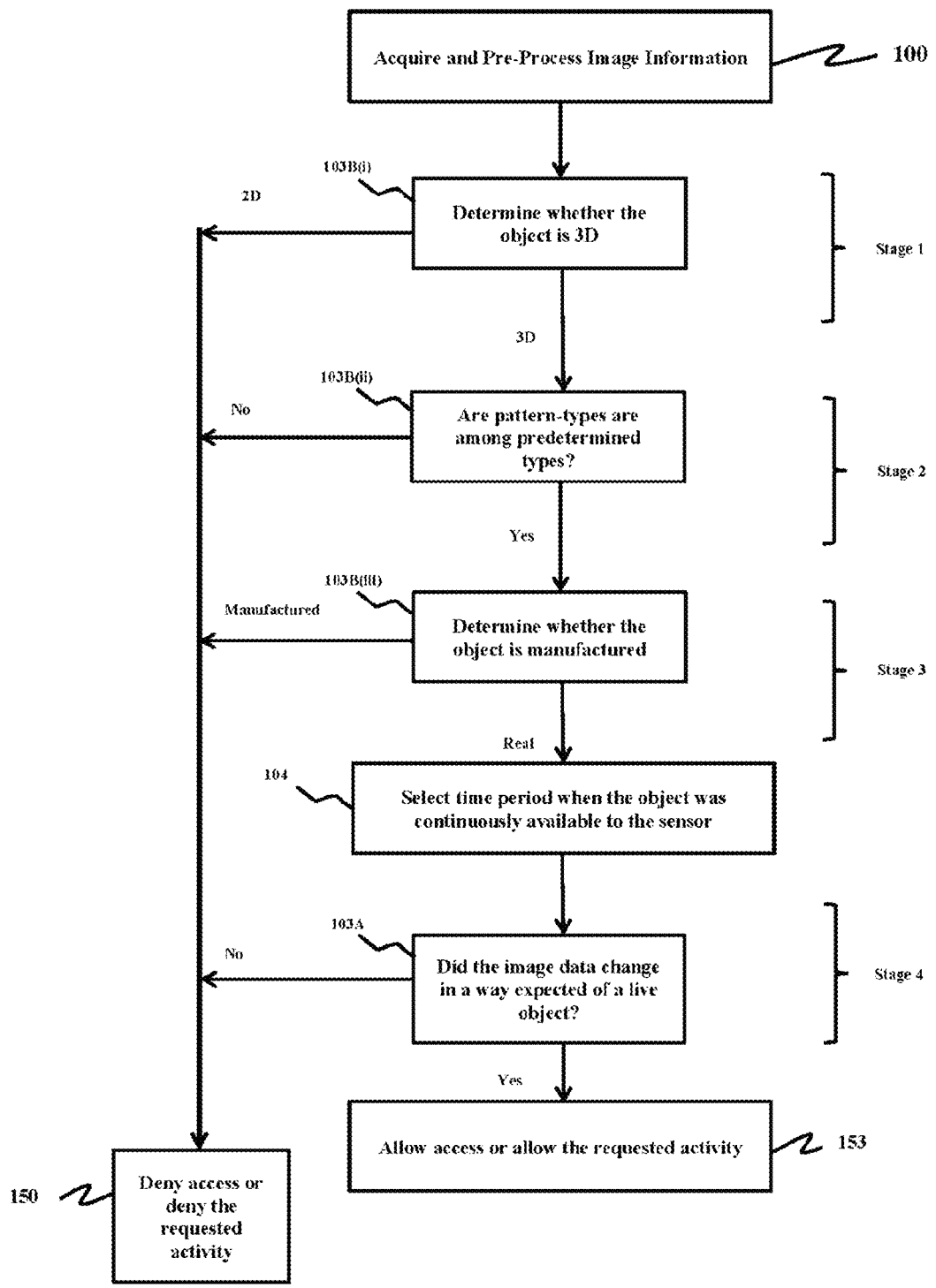
FIGS. 6A-B are flow diagrams illustrating other methods of determining liveness.

FIG. 6A is a flow diagram illustrating another method of determining liveness. The method depicted in FIG. 6A may determine whether a biometric object is part of a live individual, including the following steps:

1. acquire 100 image information from the biometric object using a sensor and optionally pre-process the image information;
2. analyze the image information to:
   (a) determine 103B(i) whether the biometric object is three-dimensional;
   (b) determine 103B(ii) whether pattern types in the image information are among predetermined pattern types;
   (c) determine 103B(iii) whether the biometric object is manufactured (e.g., non-biometric); and
   (d) select a time period throughout which the biometric object is continuously available to the sensor, and determine 103A whether the image information changes during the time period in a manner that is consistent with a live object; and
3. conclude that the biometric object is part of a live individual if:
   (i) the biometric object is determined to be three-dimensional;
   (ii) the pattern types in the image information are among predetermined pattern types;
   (iii) the biometric object is determined to be not manufactured; and
   (iv) the biometric object is determined to behave in a manner that is consistent with a live object.

With the foregoing overview in mind, we provide additional details about specific types of analyses that may be carried out during the EBS 103B. In particular, the EBS 103B may include efforts directed at one or more of the following inquiries:

(i) is the object three-dimensional?,
(ii) are pattern types in the image information among predetermined pattern types?, and/or
(iii) is the object manufactured?

A conclusion that a presented biometric object may be part of a live individual may be made by the EBS 103B(i) if the image information indicates that the biometric object is three-dimensional. When the image information has been obtained from an ultrasonic sensor, such an analysis may include determining the degree to which patterns of the biometric object are uniform. A two-dimensional spoof of a fingerprint will normally have a more uniform reflection of ultrasonic waves than will a three-dimensional finger.

Figure 6B:
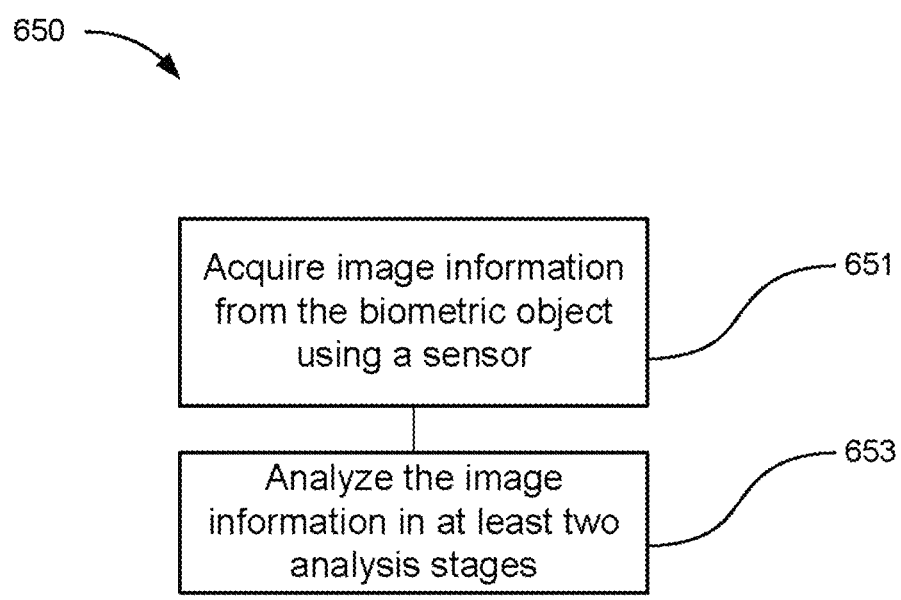

FIG. 6B is a flow diagram illustrating another method 650 of determining liveness. The method comprises acquiring 651 image information from a biometric object using a sensor. The method further comprises analyzing 653 the image information in at least two analysis steps. One of the analysis stages may be a temporal analysis stage that analyzes changes in the image information obtained during a time period throughout which the biometric object was continuously available to the sensor. The sensor may be an ultrasonic sensor. The sensor may include a platen upon which the biometric object may be positioned. In some implementations, additional sets of image information may be acquired in a time-sequential manner between the sets of image information used for the temporal analysis to ensure that the biometric object being imaged was continuously available to the sensor and had not been replaced by another biometric object.

Figure 7A:
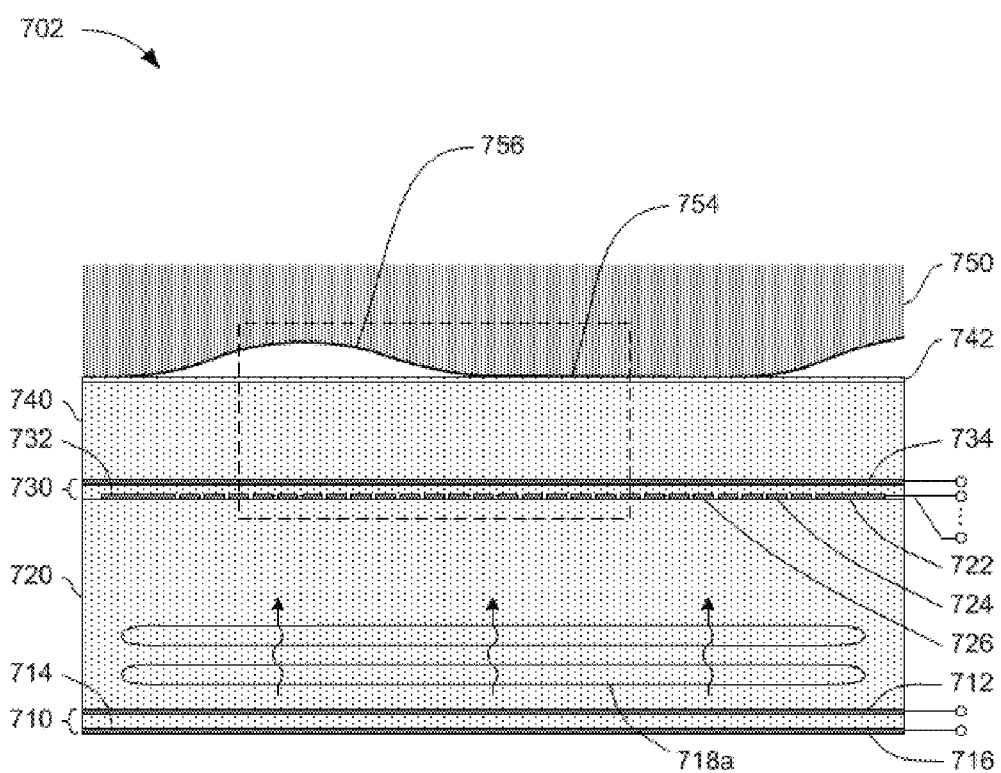
FIGS. 7A-C depict cross-sectional views of an ultrasonic sensor illustrating reflected ultrasonic signals from a real finger and a fake finger.
Figure 7B:
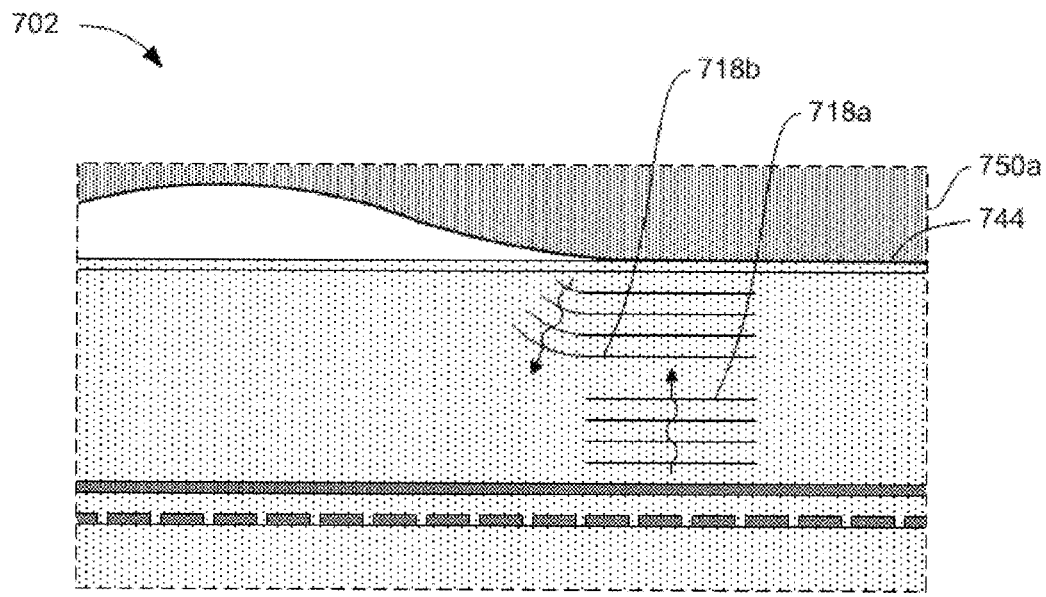
Figure 7C:
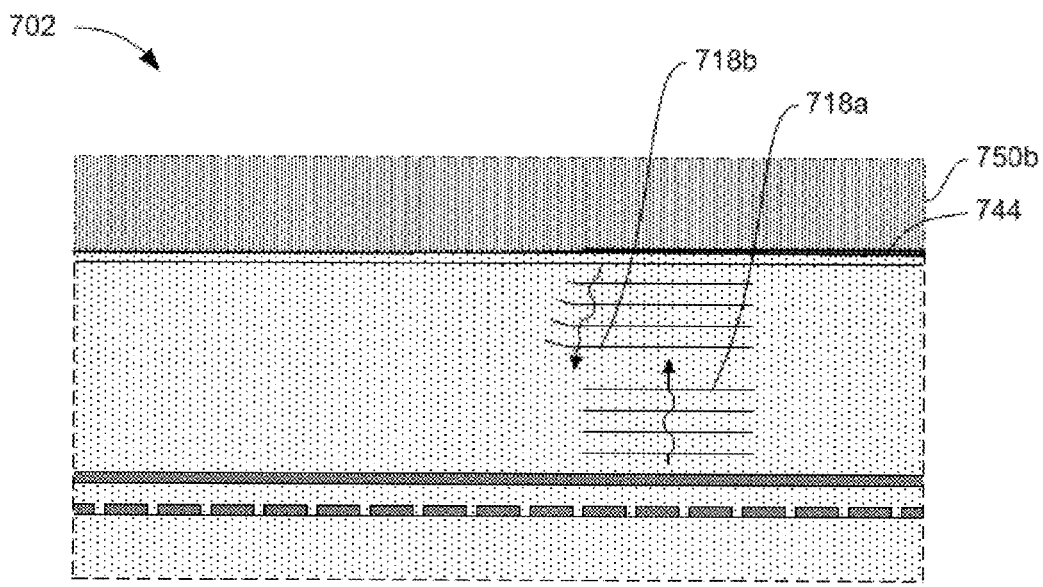

FIGS. 7A-C graphically depict cross-sectional views of an ultrasonic sensor array 702 of an ultrasonic sensor system illustrating reflected ultrasonic signals from a real finger and a fake finger.

FIG. 7A illustrates a substantially planar ultrasonic plane wave 718a launched from an ultrasonic transmitter 710 having a piezoelectric layer 714 positioned between transmitter electrodes 712 and 716 disposed on each side of the piezoelectric layer 714. The ultrasonic transmitter 710 may be coupled to a TFT substrate 720 having TFT circuitry 722 formed thereon. The ultrasonic transmitter 710 may launch one or more ultrasonic plane waves 718a through the TFT substrate 720, TFT circuitry 722 and a cover layer 740. In some implementations, the cover layer 740 may serve as a protective platen. In some implementations, a cover glass or cover lens of a display device may serve as the platen or cover layer 740. A protective coating layer 742 may be included on an outer surface of the cover layer 740. The coating layer 742 may serve as a smudge-resistant layer, a scratch-resistant layer, an environmentally protective layer, an acoustic impedance matching layer, an optical interference filter, or other functional layer. The coating layer 742 may include a multi-layer stack of sub-layers. In some implementations, the coating layer 742 may be positioned directly on the ultrasonic receiver 730 and serve as a platen. In some implementations, the ultrasonic sensor 702 may be configured without a cover layer 740 or a coating layer 742, with the outer surface of the ultrasonic receiver 703 serving as the sensing surface.

A biometric object such as a finger 750 may be positioned on an outer surface of the ultrasonic sensor array 702. Ultrasonic plane waves 718a traveling through the cover layer 740 and optional coating layer 742 may reflect off the surface between the ultrasonic sensor array 702 and the finger 750. Valley regions 756 between ridge regions 754 of a finger 750 may reflect a large portion of the incident ultrasonic energy back towards the TFT circuitry 722. Ridge regions 754 of the finger 750 in contact with the sensor surface may absorb, scatter or transmit the incident ultrasonic energy, resulting in a lower amount of ultrasonic energy reflected back towards the TFT circuitry 722. The reflected ultrasonic energy from the ridge and valley regions of the finger 750 may be converted by a piezoelectric receiver layer 732 positioned over a portion or all of the TFT circuitry 722 into electric charge that may be detected by an underlying array 726 of sensor pixels 724 of the TFT circuitry 722. A receiver bias voltage may be applied to a receiver bias electrode 734 that is positioned over the piezoelectric receiver layer 732 to allow the acquisition of image information as the reflected ultrasonic waves 718b (see FIG. 7B) pass through the piezoelectric receiver layer 732 and the TFT circuitry 722. Once acquired, pixel output signals from the array 726 of sensor pixels 724 may be clocked out from the TFT circuitry 722 for further processing using one or more data and control lines.

An enlarged portion of the ultrasonic sensor array 702 with a real finger 750a positioned on a sensor surface 744 of the ultrasonic sensor array 702 is shown in FIG. 7B, illustrating reflected ultrasonic waves 718b from a ridge region 754 of the finger. Incident ultrasonic plane waves 718a reflect off the sensor surface 744, with a portion of the reflected waves 718b reflected from an edge of the finger ridge region 754 at a higher angle and with a somewhat delayed time compared to a flat fake finger 750b shown in FIG. 7C. The fake finger 750b in FIG. 7C depicts a largely two-dimensional spoof, such as a printed photo replica of a fingerprint or a poorly made silicone spoof with low quality that has valley regions of insufficient depth. The levels and uniformity of the acquired image information may be analyzed and a determination made that the fake finger 750b does not have one or more expected biometric features for a fingerprint.

A Sobel filter may be used to determine the degree to which patterns of the biometric object are uniform. If found to be uniform, a determination may be made that the biometric object is two-dimensional, and in that situation the liveness determination may be negative (not live), and access or the requested activity may be denied. In such an analysis, a Sobel Filter "S"

$$S = \begin{bmatrix} 1 & 0 & -1 \\ 2 & 0 & -2 \\ 1 & 0 & -1 \end{bmatrix}$$

and the transpose S' may be used to filter a region of interest corresponding to the image information. The power sum of the filtered image may then be calculated, and if the average value of the power sum is lower than a predetermined threshold value, then the image information may have "weak edges" and it may be determined that the biometric object is two dimensional.

Figure 8A:
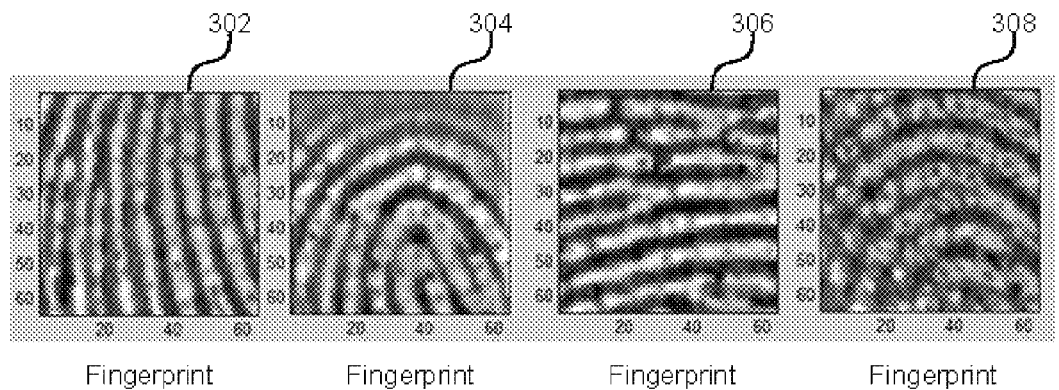
FIGS. 8A-B show fingerprint images and images from other body parts.
Figure 8B:
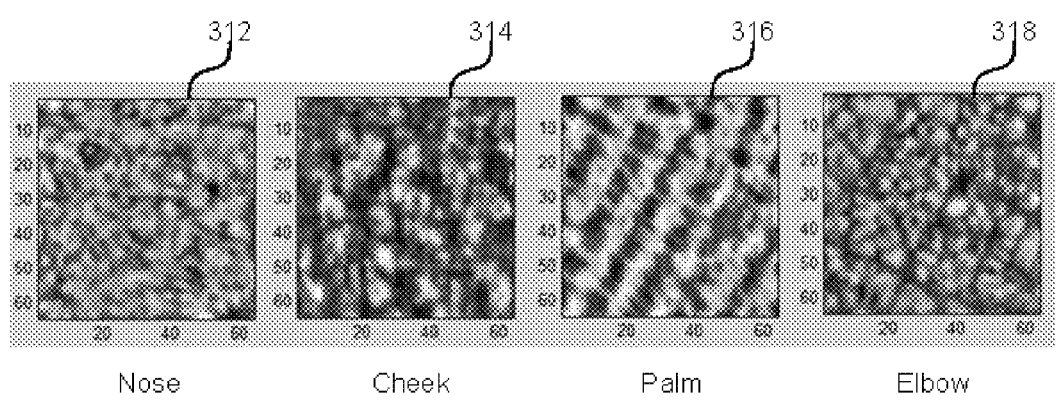

A conclusion that a biometric object is part of a live individual may be made by the EBS 103B(ii) if the image information indicates certain characteristics about pattern types in the image information. The EBS 103B(ii) may include determining whether pattern types in the image information are among predetermined pattern types. Determining whether pattern types in the image information are among predetermined pattern types may include identifying pattern classifications presented in the image information, and then determining whether the pattern classifications are among predetermined pattern classifications. In some implementations, identifying pattern classifications may include identifying whether patterns of the biometric object exhibit ridge flow, a characteristic of fingerprint images. In such an analysis, a ridge flow extraction algorithm may be used with regard to a portion or block of the image information to determine whether the ridge flow exhibited by that portion of the image information is sufficiently similar to a predetermined template that is known to be from a real finger. If the ridge flow of the image information is not sufficiently similar to the template, then it may be determined that the image information did not come from a human finger (e.g. the image information came from a non-human, or the image information came from a human but was from a nose, cheek, palm or elbow), and in that case the requested activity or access may then be denied 150. In some implementations, the template information may include pattern types and pattern classifications from an enrolled finger that may be acquired during a prior enrollment of a user. FIG. 8A shows various fingerprint images 302, 304, 306 and 308 from human fingers, and FIG. 8B shows various images of non-fingerprint body parts such as a nose 312, a cheek 314, a palm 316 and an elbow 318. Visual inspection shows ridge flow characteristics in the fingerprint images and lack of characteristic ridge flow in the non-fingerprint images.

To ensure the accuracy of this analysis, more than one portion or block of the image information may be extracted and analyzed, and if less than a desired number of the extracted portions exhibit the expected ridge flow, then it may be determined that the image information did not come from a finger, and the requested activity or access may then be denied. However, if a desired number (or more) of the extracted portions exhibit the expected ridge flow, then it may be determined that the image information came from a finger, and in that case others of the EBS 103B analyses or the dead/alive analysis 103A may be used to determine whether to allow 153 the requested activity or access or to deny 150 the requested activity or access. In some implementations, pattern classifications, also known as pattern classes, may include classifications such as a real finger classification or a spoof finger classification. A real finger classification may include sub-classifications such as a live finger sub-class or a dead finger sub-class. The spoof finger classification may include sub-classifications such as a gelatin sub-class, a silicone sub-class, a wood-glue sub-class, or a latex sub-class. Each classification or sub-classification may have one or more pattern types associated with the class or sub-class. Pattern types may include, for example, a feature type, a feature vector, a feature matrix or a feature value. For example, a pattern type may include a feature type such as a spatial frequency (e.g., high, low or medium spatial frequency). A pattern type may include a feature vector such as a local binary pattern vector (e.g., LBP vector). A pattern type may include a feature matrix, such as a two-dimensional distribution of ultrasonic impedance correlations. A pattern type may include a feature value (e.g., a number), such as an orientation consistency value.

In some implementations, a determination may be made by an expected biometric stage (EBS) 103B analysis whether an acquired image has ridges, or more specifically, whether the image contains a human fingerprint ridge pattern. For example, a ridge-flow extraction algorithm may be used with data from one or more regions of interest obtained from the imaged object to determine whether ridges are included in the acquired image and whether the ridges of the imaged object are like those that normally appear on human fingers. A ridge-pattern determination may be carried out so as to identify whether the pattern exhibited by the imaged object is likely a human fingerprint pattern or some other pattern. If the ridges of the imaged object are not like those normally appearing on human fingers then the imaged object may be labeled as "non-finger" and the result may be used to determine whether to allow 153 the requested activity or access or to deny 150 the requested activity or access.

A conclusion that a biometric object is part of a live individual may be made by the EBS 103B if the image information indicates that the biometric object is not manufactured (i.e. is organic or biological). Such an analysis may include analyzing the image information to determine whether the biometric object is comprised of manufactured layers. If it is determined that the biometric object is comprised of layers, then it may be determined that the biometric object is manufactured. For example, layers in an object may indicate the use of three-dimensional printed spoofs, which are generally printed in layers. In another example, layers may be detected in a biometric object that includes a thin latex spoof having false fingerprint features slid over a finger of an unauthorized user. To determine whether the biometric object is comprised of layers, an ultrasonic sensor may be used, and the range-gate delay for the detection of ultrasonic signals striking the piezoelectric receiver layer and pixel circuitry of the sensor may be adjusted in order to determine whether a layer exists at a particular depth measured from a surface of the biometric object. Other methods of identifying whether the biometric object is comprised of layers include the use of a plurality of ultrasonic frequencies. In some implementations, multiple frequencies and different range-gate delays may be used to acquire multiple sets of image information about the biometric object. An image-fusion algorithm may be used to derive a single set of image information, and that derived set of image information may be analyzed for the presence of layers. Another way of determining whether layers exist is to compare the quality of the derived image information against a threshold value. If the quality of the derived image information fails to meet or exceeds the threshold value, then it may be determined that the image information was not derived from a biometric object that is part of a living being, and that a manufactured spoof instead was presented to the sensor.

Figure 9:
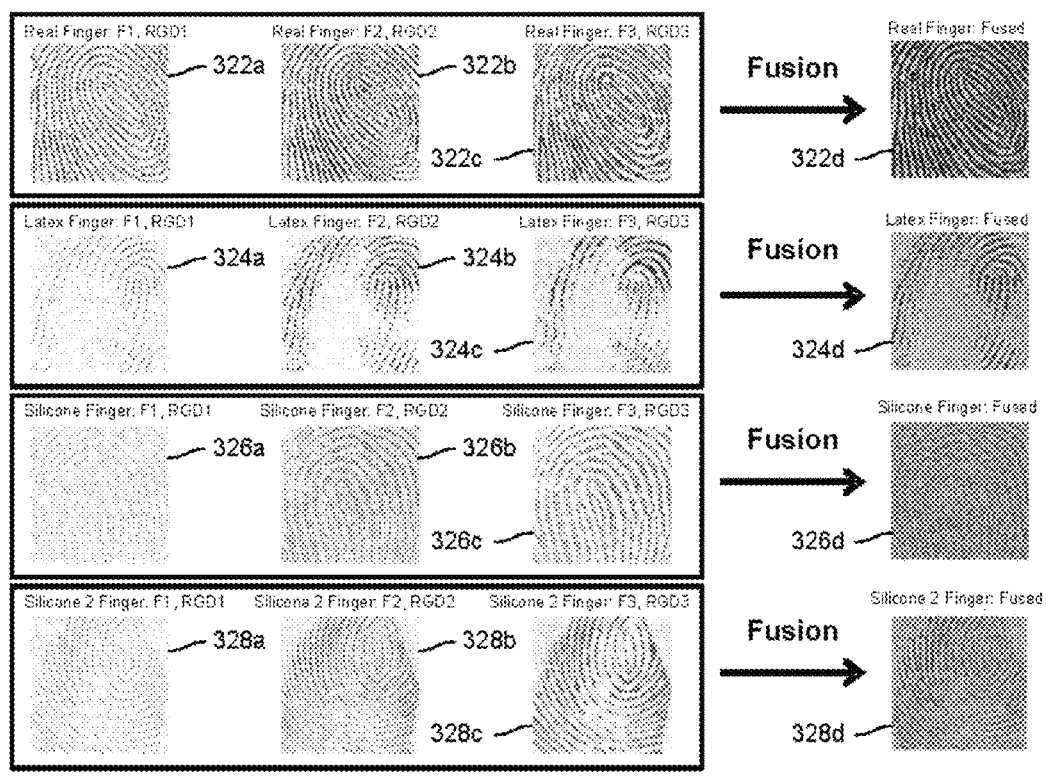
FIG. 9 shows images derived from image information acquired at different frequencies and range-gate delays for real and fake fingers.

Another method may use a multiple-feature based classification method to identify a manufactured spoof. In such a method, subtle differences between real fingers and fake fingers at different frequencies may be analyzed and assessed. FIG. 9 shows images derived from image information acquired at different frequencies and range-gate delays for real and fake fingers. For example, in the top row, image information from a real finger at a first frequency F1 and a first range-gate delay RGD1 is shown as a fingerprint image 322a. Image information from the finger at a second frequency F2 and a second range-gate delay RGD2 is shown as a fingerprint image 322b, and image information from the finger at a third frequency F3 and a third range-gate delay RDG3 is shown as fingerprint image 322c. The image information may be fused together using an imaging-fusion algorithm, with the result shown as a fused fingerprint image 322d. The second row shows a latex finger with images 324a, 324b and 324c taken at a first frequency F1 and first range-gate delay RGD1, a second frequency F2 and a second range-gate delay RGD2, and a third frequency F3 and a third range-gate delay RGD3, respectively, with the results of image fusion shown as fused image 324d. The third row shows a silicone finger with images 326a, 326b and 326c taken at a first frequency F1 and first range-gate delay RGD1, a second frequency F2 and a second range-gate delay RGD2, and a third frequency F3 and a third range-gate delay RGD3, respectively, with the results of image fusion shown as fused image 326d. Similarly, the fourth row shows a type 2 silicone finger with images 328a, 328b and 328c taken at a first frequency F1 and first range-gate delay RGD1, a second frequency F2 and a second range-gate delay RGD2, and a third frequency F3 and a third range-gate delay RGD3, respectively, with the results of image fusion shown as fused image 328d. Images prior to and after image fusion in FIG. 9 show characteristic changes in image features, image quality, image contrast that may be used to separate a spoofed finger from a real finger. For example, pore position and pore density may change with the type of spoof material and the depth of imaging into the finger. A high-quality spoof may have a suitable number of pores and pore density at the surface of the spoof, which may diminish rapidly with depth away from the spoof surface unlike a human finger. The number and density of pores with depth into the finger may aid in determining a spoof from a real finger.

Figure 10:
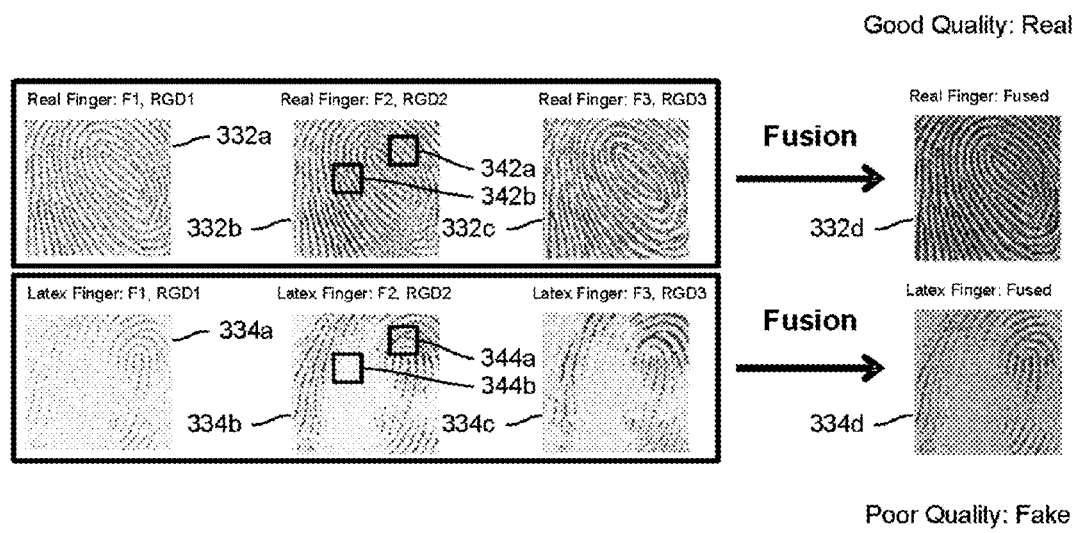
FIG. 10 depicts image information that may be used to assess image quality differences between real and fake fingers.

FIG. 10 depicts image information that may be used to assess image quality differences between real and fake fingers. Fingerprint image quality may be used as a cue to detect fake versus real fingerprint image information. Fake fingers or spoofs may be detected using quality metrics on an acquired ultrasonic image of a fake finger. Fake fingers may be manufactured from one of several different materials such as latex, silicone, or other polymeric material. In some cases, the flexibility of the material may make it harder for the spoof to have full contact with the sensor array resulting in patchy, non-uniform quality in the resulting image. In some cases, localized bony structures within a real finger may result in localized protrusions during mold formation for casted fake fingers. Fingerprint quality metrics such as spatial resolution, contrast, spatial frequency, pattern consistency, clarity and/or sharpness may detect these non-uniformities. Fingerprint quality metrics may further improve the performance of fake versus real finger detection systems. While not able to detect liveness directly, fingerprint quality may be used as a cue to detect fake fingerprint image information as part of a multi-stage approach to liveness detection. Acoustic impedance differences between the materials used in the spoof and human tissue may also result in detectable image quality differences.

One approach to utilizing quality metrics on a spoof finger involves selecting two or more small regions (i.e., blocks) within the fingerprint image area, applying a quality metric such as clarity or sharpness to each selected block, then comparing the results of the calculations to determine if one or more areas have significantly different clarity or sharpness than the others. A wide variation in the calculated results may indicate a fake finger.

An example of a quality-based spoof detection method can be seen with respect to images in FIG. 10. As in FIG. 9, the images in FIG. 10 may be taken with differing frequencies and range-gate delays. A first box 342a and a second box 342b may be formed around a selected pair of blocks or regions within fingerprint images 332a, 332b and 332c from a real finger. The resulting clarity and sharpness of features within the two blocks may be seen to be similar. A first box 344a and a second box 344b may be drawn around similar blocks or regions within fingerprint images 334a, 334b and 334c from a fake finger. The resulting clarity and sharpness between the two blocks may be seen to be significantly different. It may be suspected, based on this analysis, that the second image is from a fake finger. In some implementations, the image analysis may be performed on individual fingerprint images at one or more frequencies and range-gate delays. In some implementations, the image analysis may be performed on fused images such as fused fingerprint images 332d and 334d for real and fake fingers, respectively. The suspicion may be reinforced with the results from other tests and analyses such as expected biometric analysis stages or temporal analysis stages.

Figure 11A:
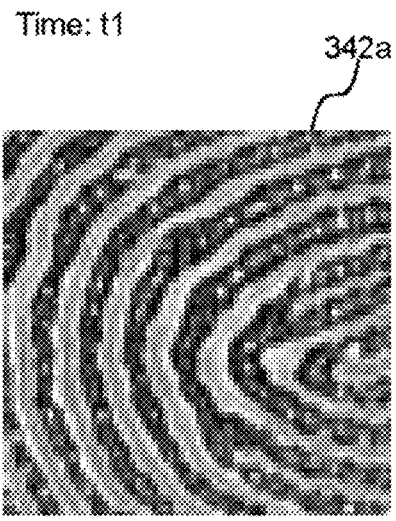
FIGS. 11A-C illustrate temporal changes of fingerprint images.
Figure 11B:
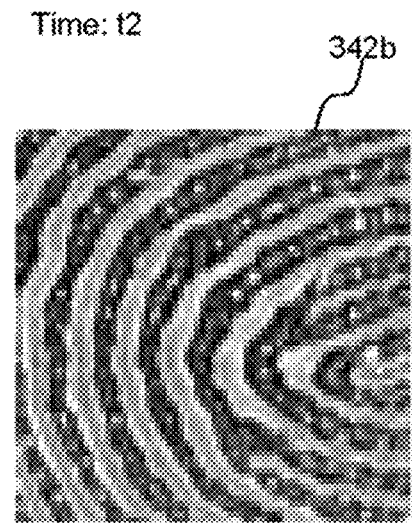
Figure 11C:
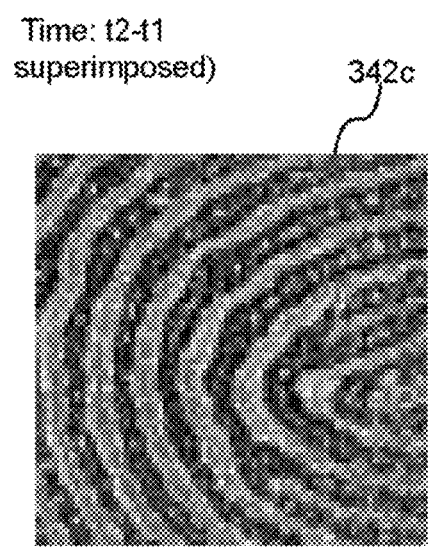

FIGS. 11A-C illustrate temporal changes of fingerprint images. A fingerprint image 342a (FIG. 11A) taken at a first time t1 and a second fingerprint image 342b (FIG. 11B) taken at a second time t2 different from the first time t1 of the same finger may be compared. A compared fingerprint image 342c resulting from subtracting the pixel output values at time t1 from the pixel output values at time t2 and superimposing the resulting subtraction onto the original fingerprint image 342a is shown in FIG. 11C.

In some implementations, liveness of a finger-like object may be determined in part whether an acquired fingerprint has 2-D characteristics only or is a 3-D object. Skin-like object detection and 3-D object determination may form stages in a liveness detection system and method. Contact-based fingerprint imaging systems such as an ultrasonic sensor array with or without an overlying platen may reveal characteristics of the imaged object and aid in determining if the object is skin-like and three-dimensional. For example, force or pressure exerted on the platen surface by a finger is often temporal and non-uniform and may lead to finger motion between one image acquisition and another. During each image acquisition, the fingerprint detection system may convert the 3-D object to a 2-D equivalent image. Elasticity of the finger and skin may cause more stretching of the skin with larger pressure than with lower pressure. The pressure exerted by a 3-D object on the platen surface may be the highest at the center of a depressed finger and decrease towards the boundary or edge of the fingerprint. The center of the depressed finger may have more prominent edges and thinning of the edges may be more noticeable near the finger periphery. In contrast, a 2-D object may have more uniform edge strength throughout the entirety of the imaged object. An image gradient along the x- and y-directions may aid in determining whether the object is 2-D or 3-D. An image gradient may be computed from image data by applying a Sobel filtering kernel along the X and Y direction with $S_x$ and $S_y$ as provided below.

$$S_x = \begin{bmatrix} 1 & 0 & -1 \\ 2 & 0 & -2 \\ 1 & 0 & -1 \end{bmatrix}$$

$$S_y = \begin{bmatrix} 1 & 2 & 1 \\ 0 & 0 & 0 \\ -1 & -2 & 1 \end{bmatrix}$$

The acquired image may be convolved with the $S_x$ and $S_y$ filters to generate two corresponding responses $g_x$ and $g_y$. The image gradient may be calculated from the responses $g_x$ and $g_y$ as $\nabla I = [g_x \, g_y]^T$. The object edges may be determined from the gradient images with a thresholding operation. An edge strength may be used as a descriptor and used as a measure of image contrast (i.e., how significant is the intensity variation across the edge and along the edge). Comparison of edge strength or gradient information with respect to a pre-established heuristic edge-strength or gradient threshold may determine if the object is a 3-D object.

In some implementations, temporal fingerprint information may aid in 3-D object determination due to slight rolling of the finger on the platen surface. For example, a plurality of images of a 3-D object acquired with a separation in time may show slightly different views of the object with rolling or variations in applied force, such as a change in edge features or an enlarged or reduced edge region. In contrast, temporal information from a 2-D object may show heightened consistency from image to image.

In some implementations, an analysis stage to determine whether an object is 2-D or 3-D may be followed by an additional analysis stage to determine the presence of a skin-like surface. For example, the presence of a skin-like surface may be validated by matching a skin-tone histogram generated from an acquired image with a reference skin-tone histogram determined from a collection of valid skin tones. In some implementations, the reference skin-tone histogram may be obtained during enrollment of a user.

In some implementations, a determination whether a pattern in an acquired image is skin-like may be made by comparing the reflected energy associated with the location of a ridge with the reflected energy associated with a valley. If the outcome of the comparison is similar to an expected reflected ridge/valley energy outcome, then the object may be determined to be skin-like.

In some implementations, a skin-like surface may be determined by locating skin pores of a finger-like 3-D object. For example, skin pores may be located in 3-D objects by detecting circular regions noticeable in ridge regions or by detecting characteristic peaks in certain regions of a Fourier spectrum of the imaged object that are representative of pore size, linear pore density, or areal pore density.

In some implementations, image-based liveness detection based on the analysis of image information from a single image may serve as one of the non-temporal analysis stages. A single-image based EBS may include the steps of acquiring a fingerprint image having fingerprint image information and extracting liveness features from the image information. The extracted liveness features may be compared with one or more baseline features to provide a comparison, and a liveness output signal may be determined based on the comparison. The image information may be acquired from a user's finger positioned on a surface of a platen that is part of an ultrasonic sensor array. Methodologies for extracting liveness features from image information may seek to identify differences in textural components (as opposed to geometrical components) in fingerprints, as it is often relatively easy to create a fake fingerprint with proper geometric components yet more difficult to create a fake fingerprint with proper textural components. For example, a fake fingerprint may have noticeably different gray-level distributions between ridge and valley regions of the fingerprint. In some methodologies, raw liveness features may be determined in either spatial or frequency domains. Raw liveness features may be calculated with respect to the ridges of the fingerprint and with respect to the valleys of the fingerprint. These raw liveness features may be sufficient to make a liveness determination on the image information. In some implementations, ratios of the raw liveness features may be used to determine whether the object is live or not. Other methodologies are described in the U.S. application Ser. No. 14/845,174 entitled "Image-Based Liveness Detection for Ultrasonic Fingerprints" filed concurrently herewith on Sep. 3, 2015.

In some implementations, image-based liveness detection based on the analysis of image information from two or more images may serve as a temporal analysis stage. For example, image information from consecutively acquired fingerprint images may be individually analyzed for raw liveness features, and changes to the raw liveness features over time may be a strong indicator in favor of a positive liveness determination.

In some implementations, intermediate decisions from each of a plurality of single images may be fused to form a composite decision. For example, an intermediate liveness determination may be made from two or more images, and the intermediate liveness determinations combined to form a composite liveness determination. The composite liveness determination may be combined with determinations from other stages to provide a liveness output signal that is indicative of the liveness of the imaged object.

In some implementations, intermediate decisions from one or more image-based liveness detection analyses may be used to determine whether the object is manufactured. For example, raw liveness features extracted from a manufactured spoof may show little change from one image to the next.

Figure 12:
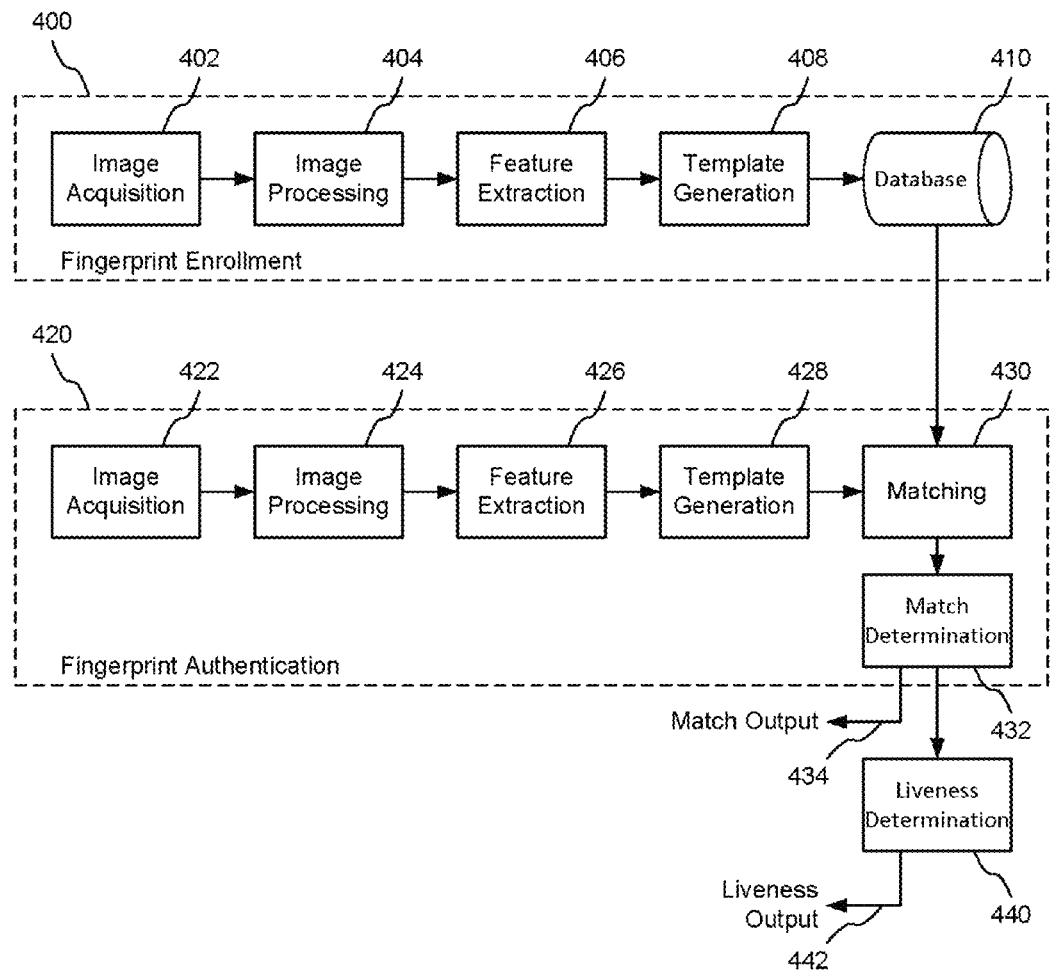
FIG. 12 illustrates generalized flows for fingerprint enrollment and/or authentication followed by a liveness determination stage.

FIG. 12 illustrates generalized flows for fingerprint enrollment and/or authentication followed by a liveness determination stage according to aspects of the present disclosure. In this example, block 400 describes the enrollment process and block 420 describes the verification/authentication process. During enrollment, an acquired image may be processed to generate a template (e.g. template information, template data, biometric reference data, or reference) that may be stored in a local or external database 410. Note that a reference may include one or more templates, models, or raw images. In some implementations, the enrollment process may include image acquisition 402, image processing 404, feature extraction 406, template generation 408, and data storage in a database 410. The verification/authentication process in block 420 may include image acquisition 422, image processing 424, feature extraction 426, template generation 428, fingerprint matching 430 using information stored in the database 410, and match determination 432 to determine and provide a match output signal 434. In the identification/verification/authentication stage, each acquired image may be processed to generate a template; the generated templates may be used for matching. The fingerprint verification/authentication block 420 may provide a match output signal 434 indicating whether a match has occurred. One or more liveness determination stages 440 may perform various temporal analyses and/or expected biometric analyses to determine whether a finger is real or fake and whether the finger is dead or alive. A liveness output signal 442 may be provided that indicates a liveness determination. In some implementations, a liveness determination 440 to provide a liveness output signal 442 may be made during the fingerprint enrollment block 400. In some implementations, the liveness output signal 442 may be provided to determine whether to enroll a user. In some implementations, the liveness output signal 442 may be provided to determine whether to verify, identify or authenticate a user. For example, the liveness output signal 442 may be combined with a match output signal 434 to determine whether to authenticate or verify a user. A positive match output signal 434 and a positive liveness output signal 442 may be combined to allow access or to allow a requested activity. In some implementations, the liveness output signal 442 may be generated and provided to a software application or an application running on a mobile or non-mobile device. In some implementations, pattern types may be determined during enrollment. The pattern types may be stored as part of a template associated with an object such as a finger. In some implementations, pattern classifications may be determined during enrollment. The pattern types and pattern classifications may be used in part for authentication or verification. During a verification sequence, the pattern types and/or pattern classifications for a particular user may be updated. The updated pattern types and/or pattern classifications may be stored in a modified template.

Figure 13:
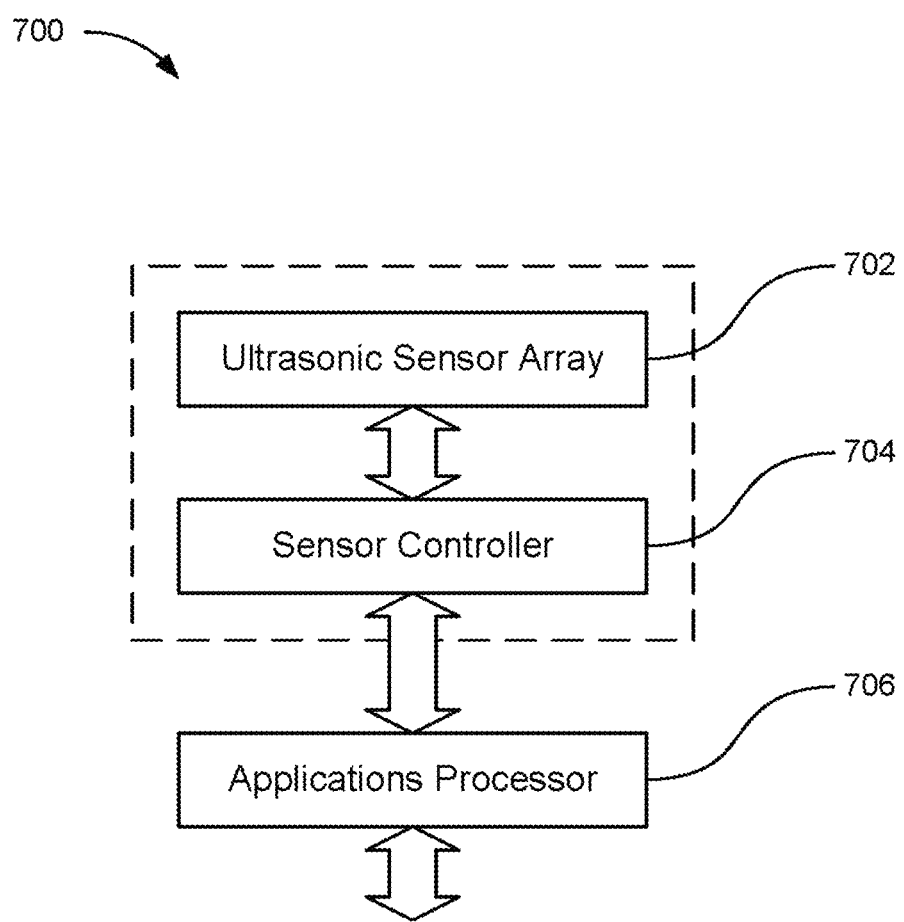
FIG. 13 illustrates a generalized block diagram of an ultrasonic sensor system.

FIG. 13 illustrates a generalized block diagram of an ultrasonic sensor system 700. Ultrasonic sensor system 700 may include an ultrasonic sensor array 702 and a sensor controller 704. Ultrasonic sensor array 702 may include one or more arrays of sensor pixels. The ultrasonic sensor system 700 may include at least one ultrasonic sensor array 702. In some implementations, components of the ultrasonic sensor array 702 may be similar to components of a touch sensor system that are described below with reference to FIGS. 15A-16B. In some implementations, the ultrasonic sensor array 702 and the sensor controller 704 may be configured differently. For example, the ultrasonic sensor system 700 and the ultrasonic sensor array 702 may be part of a touch sensor system associated with a display device, depending on the particular implementation.

The sensor controller 704 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The sensor controller 704 also may include (and/or be configured for communication with) one or more memory devices, such as one or more random access memory (RAM) devices, read-only memory (ROM) devices, etc. The sensor controller 704 may be capable of receiving and processing fingerprint sensor image information from the ultrasonic sensor array 702. In some implementations, some or all of the functions of the sensor controller 704 may reside in or be performed by an applications processor of a mobile device.

Figure 14:
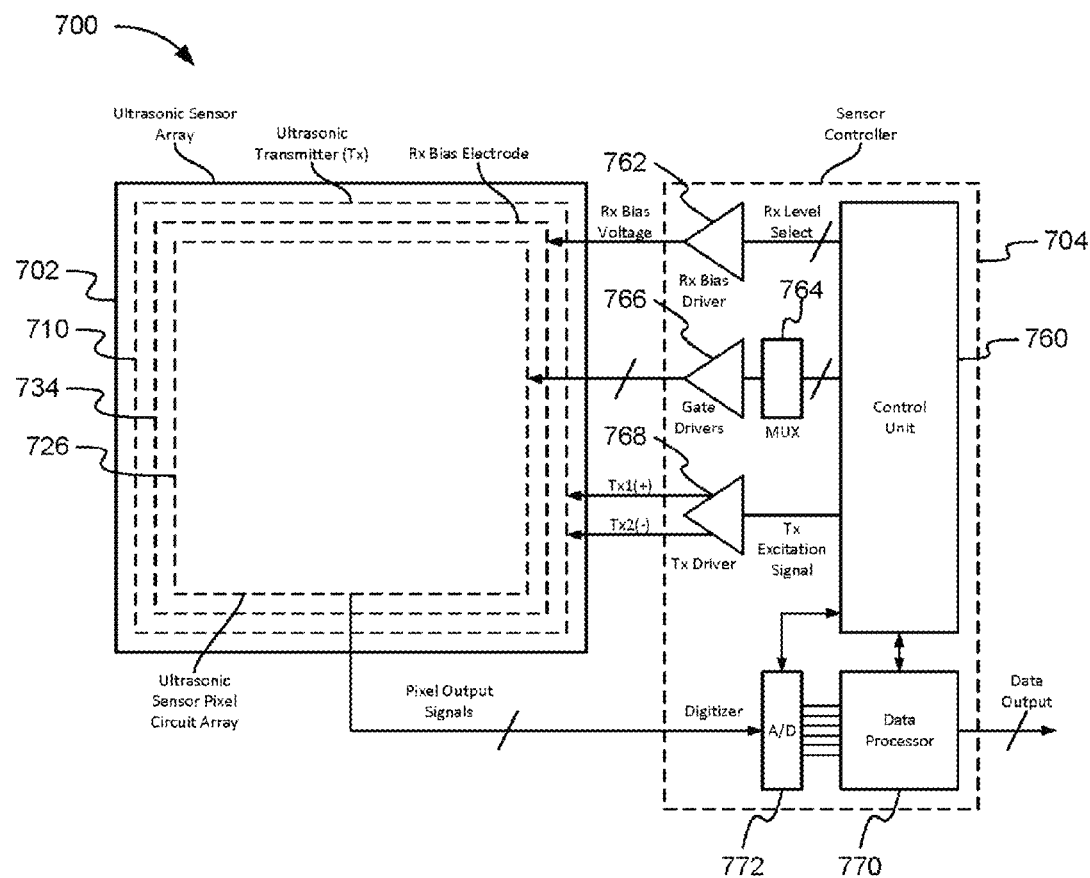
FIG. 14 illustrates a more detailed block diagram of an ultrasonic sensor system.

FIG. 14 illustrates a more detailed block diagram of an ultrasonic sensor system. The ultrasonic sensor system 700 may include an ultrasonic sensor array 702 with an ultrasonic transmitter 710 and TFT substrate 720 including TFT circuitry with a sensor pixel array 726. The ultrasonic transmitter 710 may be in electronic communication (for example, through one or more electronic connections) to a transmitter driver 768. In some implementations, the transmitter driver 768 may have a positive polarity output signal and a negative polarity output signal in electronic communication with the ultrasonic transmitter 710. The transmitter driver 768 may be in electronic communication with a control unit 760 of a sensor controller 704. The control unit 760 may provide a transmitter excitation signal to the transmitter driver 768. The control unit 760 may be in electronic communication with a receiver bias driver 762 through a level select input bus. The receiver bias driver 762 may provide a receiver bias voltage to a receiver bias electrode 734 disposed on a surface of a piezoelectric receiver layer 732 that may be attached to the sensor pixel array 726 (see FIG. 7A). The control unit 760 may be in electronic communication with one or more demultiplexers 764. The demultiplexers 764 may be in electronic communication with a plurality of gate drivers 766. The gate drivers 766 may be in electronic communication with the sensor pixel array 726. The gate drivers 766 may be positioned external to the sensor pixel array 726 or in some implementations included on the same substrate as the sensor pixel array 726. The demultiplexers 764, which may be external to or included on the same substrate with the sensor pixel array 726, may be used to select specific gate drivers 766. The gate drivers 766 may select one or more rows or columns of the sensor pixel array 726. The sensor pixel array 726 may be in electronic communication with one or more digitizers 772. The digitizers 772 may convert analog pixel output signals from one or more sensor pixels 724 of the sensor pixel array 726 to a digital signal suitable for further processing within a data processor 770 that is in or external to the sensor controller 704. The sensor controller 704 may provide a digital output to an external system or processor, such as an applications processor of a mobile device.

Figure 15A:
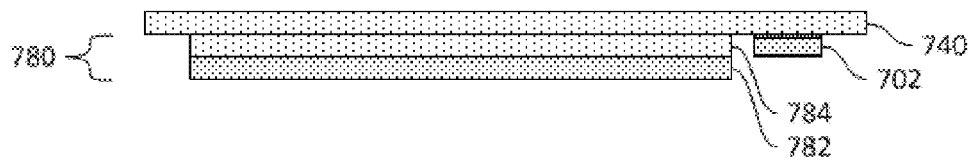
FIGS. 15A-D illustrate a variety of configurations of an ultrasonic sensor array.
Figure 15B:
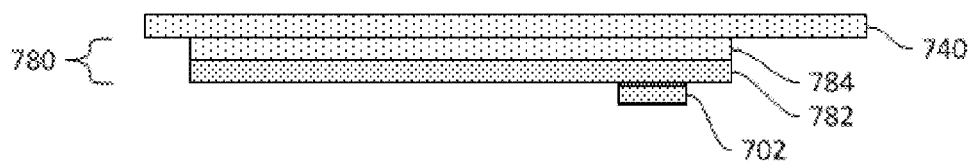
Figure 15C:
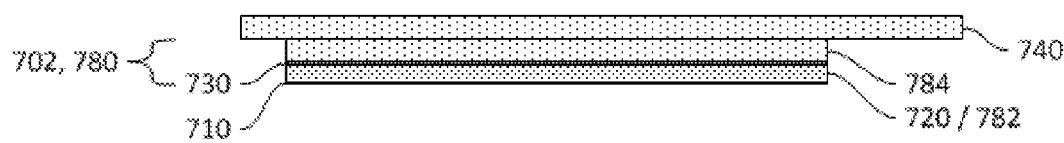
Figure 15D:
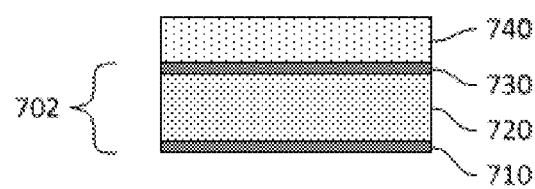

FIGS. 15A-D illustrate a variety of possible configurations of an ultrasonic sensor array. The ultrasonic sensor array 702 may have separate or common TFT substrates for a display 780 and the ultrasonic sensor array 702. The ultrasonic sensor array 702 may serve as a fingerprint sensor and in some implementations serve as an ultrasonic touchscreen or touchpad. A common cover glass or touchscreen may be shared between elements of the ultrasonic sensor array 702 and the display, and serve as a cover layer 740 for the ultrasonic sensor array 702. In alternative configurations, the ultrasonic sensor array 702 (and optional coating or cover layer) may be positioned on a bezel, on the side, or on the back of a mobile device enclosure. In some implementations, the ultrasonic sensor array 702 may be placed above or positioned as part of an ultrasonic button. The ultrasonic button may be mechanical or non-mechanical. For example, the ultrasonic button may be mechanically coupled to an electromechanical switch. The ultrasonic button may be authenticating or non-authenticating. In some implementations, the ultrasonic sensor array 702 may be peripheral to the active area of the display, which may include a display color filter glass 784 and a display TFT substrate 782. In the example shown in FIG. 15A, the ultrasonic sensor array 702 is positioned beneath a common cover layer 740 that may serve as a platen for the ultrasonic sensor array and as a touchscreen or cover glass for the display 780. In another example, the ultrasonic sensor array 702 may be situated separately from the display, such as in a bezel region, a sidewall or a backside of a mobile device enclosure (not shown). In another example shown in FIG. 15B, the ultrasonic sensor array 702 may be situated beneath (or behind) elements of the display 780, such as display color filter glass 784 and display TFT substrate 782. In another example shown in FIG. 15C, portions or all of the ultrasonic sensor array 702 may be integrated within the display TFT substrate 782. In some implementations, the ultrasonic sensor array 702 may include part of or all of the active area of the display 780. FIG. 15D shows a cutaway view of an ultrasonic sensor array 702 having an ultrasonic transmitter 710 and an ultrasonic receiver 730 positioned on a TFT substrate 720, with a cover layer 740 positioned above the ultrasonic receiver 740.

Figure 16A:
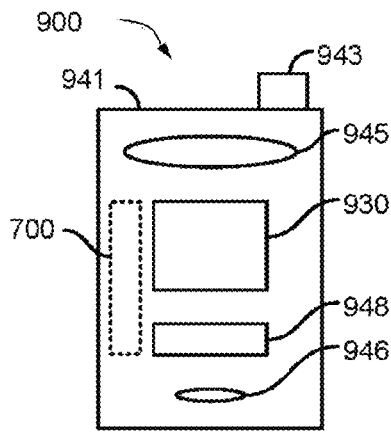
FIGS. 16A-B show examples of system block diagrams illustrating a display device that includes a fingerprint sensing system as described herein.
Figure 16B:
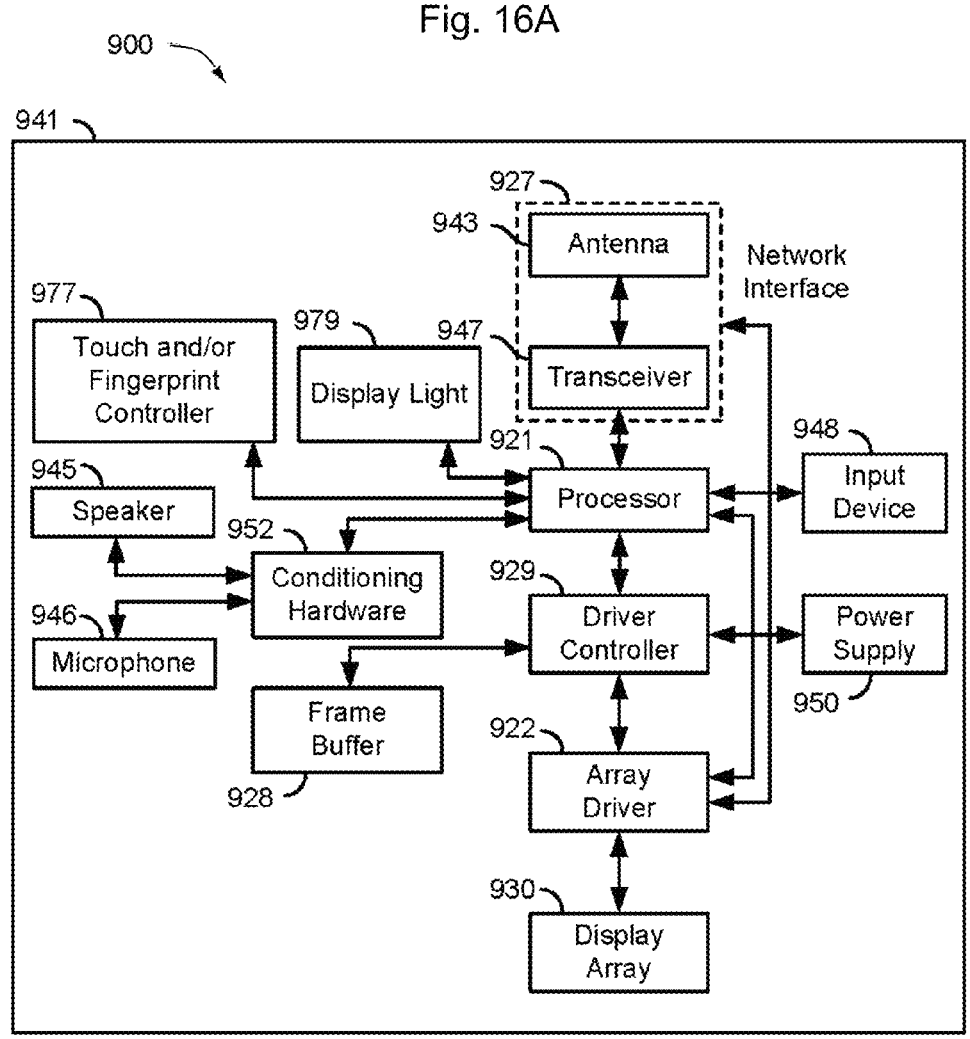

FIGS. 16A and 16B show examples of system block diagrams illustrating a display device that includes a fingerprint sensing system as described herein. The display device 900 may be, for example, mobile display device such as a smart phone, a cellular or mobile telephone, etc. However, the same components of the display device 900 or slight variations thereof are also illustrative of various types of display devices such as televisions, computers, tablet computers, e-readers, hand-held devices and portable media devices.

In this example, the display device 900 may include a housing 941, a display 930, an ultrasonic sensor system 700 (a portion of which may part of or separated from the visual display 930), an antenna 943, a speaker 945, an input device 948 and a microphone 946. In some implementations, the input device 948 may include an ultrasonic sensor array 702 that may serve as part of an ultrasonic fingerprint sensor, touchpad, or touchscreen. The housing 941 may be formed from any of a variety of manufacturing processes, including injection molding and vacuum forming. In addition, the housing 941 may be made from any of a variety of materials, including, but not limited to plastic, metal, glass, sapphire, rubber, ceramic, or a combination thereof. The housing 941 may include removable portions (not shown) that may be interchanged with other removable portions of different color, or containing different logos, pictures, or symbols.

The display 930 may be any of a variety of displays, including a flat-panel display, such as plasma, organic light-emitting diode (OLED) or liquid crystal display (LCD), or a non-flat-panel display, such as a cathode ray tube (CRT) or other tube device. In addition, the display 930 may include an interferometric modulator (IMOD)-based display or a micro-shutter based display.

The components of one example of the display device 900 are schematically illustrated in FIG. 16B. Here, the display device 900 may include a housing 941 and may include additional components at least partially enclosed therein. For example, the display device 900 may include a network interface 927 with one or more antennas 943 which may be coupled to one or more transceivers 947. The network interface 927 may be a source for image information that may be displayed on the display device 900. Accordingly, the network interface 927 is one example of an image source module, but the processor 921 and the input device 948 also may serve as an image source module. The transceiver 947 may be connected to a processor 921, which may be connected to conditioning hardware 952. The conditioning hardware 952 may be capable of conditioning a signal (such as applying a filter or otherwise manipulating a signal). The conditioning hardware 952 may be connected to a speaker 945 and a microphone 946. The processor 921 also may be connected to an input device 948 and a driver controller 929. The driver controller 929 may be coupled to a frame buffer 928, and to an array driver 922, which in turn may be coupled to a display array 930. One or more elements in the display device 900, including elements not specifically depicted in FIG. 16B, may be capable of functioning as a memory device and be capable of communicating with the processor 921 or other components of a control system. In some implementations, a power supply 950 may provide power to substantially all components in the particular display device 900 design.

In this example, the display device 900 may include a touch and/or fingerprint controller 977. The touch and/or fingerprint controller 977 may, for example, be a part of an ultrasonic sensor system 700 such as that described above. Accordingly, in some implementations the touch and/or fingerprint controller 977 (and/or other components of the ultrasonic sensor system 700) may include one or more memory devices. In some implementations, the ultrasonic sensor system 700 also may include components such as the processor 921, the array driver 922 and/or the driver controller 929 shown in FIG. 16B. The touch and/or fingerprint controller 977 may be capable of communicating with the ultrasonic sensor system 700, e.g., via routing wires, and may be capable of controlling the ultrasonic sensor system 700. The touch and/or fingerprint controller 977 may be capable of determining a location and/or movement of one or more objects, such as fingers, on or proximate the ultrasonic sensor system 700. In some implementations, the processor 921 (or another part of the ultrasonic sensor system 700) may be capable of providing some or all of the functionality of the touch and/or fingerprint controller 977, the ultrasonic sensor system 700 and/or the sensor controller 704 as described above.

The touch and/or fingerprint controller 977 (and/or another element of the ultrasonic sensor system 700) may be capable of providing input for controlling the display device 900 according to one or more touch locations. In some implementations, the touch and/or fingerprint controller 977 may be capable of determining movements of one or more touch locations and providing input for controlling the display device 900 according to the movements. Alternatively, or additionally, the touch and/or fingerprint controller 977 may be capable of determining locations and/or movements of objects that are proximate the display device 900. Accordingly, the touch and/or fingerprint controller 977 may be capable of detecting finger or stylus movements, hand gestures, etc., even if no contact is made with the display device 900. The touch and/or fingerprint controller 977 may be capable of providing input for controlling the display device 900 according to such detected movements and/or gestures.

As described elsewhere herein, the touch and/or fingerprint controller 977 (or another element of the ultrasonic sensor system 700) may be capable of providing one or more fingerprint detection operational modes. Accordingly, in some implementations the touch and/or fingerprint controller 977 (or another element of the ultrasonic sensor system 700) may be capable of producing fingerprint images. In some implementations, such as when an ultrasonic sensor array 702 of the ultrasonic sensor system 700 is physically separated from the visual display 930, the controller for the ultrasonic sensor system 700 may be separate from and operate largely independent of the touch controller.

In some implementations, the ultrasonic sensor system 700 may include an ultrasonic receiver 730 and/or an ultrasonic transmitter 710 such as described elsewhere herein. According to some such implementations, the touch and/or fingerprint controller 977 (or another element of the ultrasonic sensor system 700) may be capable of receiving input from the ultrasonic receiver 730 and powering on or "waking up" the ultrasonic transmitter 710 and/or another component of the display device 900.

The network interface 927 may include the antenna 943 and the transceiver 947 so that the display device 900 may communicate with one or more devices over a network. The network interface 927 also may have some processing capabilities to relieve, for example, data processing requirements of the processor 921. The antenna 943 may transmit and receive signals. In some implementations, the antenna 943 transmits and receives RF signals according to the IEEE 16.11 standard, including IEEE 16.11(a), (b), or (g), or the IEEE 802.11 standard, including IEEE 802.11a, b, g, n, ac, ad, and further implementations thereof. In some implementations, the antenna 943 may transmit and receive RF signals according to the Bluetooth® standard. In the case of a cellular telephone, the antenna 943 may be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 947 may pre-process the signals received from the antenna 943 so that they may be received by and further manipulated by the processor 921. The transceiver 947 also may process signals received from the processor 921 so that they may be transmitted from the display device 900 via the antenna 943.

In some implementations, the transceiver 947 may be replaced by a receiver. In addition, in some implementations, the network interface 927 may be replaced by an image source, which may store or generate image information to be sent to the processor 921. The processor 921 may control the overall operation of the display device 900. The processor 921 may receive data, such as compressed image information from the network interface 927 or an image source, and process the data into raw image information or into a format that may be readily processed into raw image information. The processor 921 may send the processed data to the driver controller 929 or to the frame buffer 928 for storage. Raw data typically refers to the information that identifies the image characteristics at each location within an image. For example, such image characteristics may include color, saturation and gray-scale level.

The processor 921 may include a microcontroller, CPU, or logic unit to control operation of the display device 900. The conditioning hardware 952 may include amplifiers and filters for transmitting signals to the speaker 945, and for receiving signals from the microphone 946. The conditioning hardware 952 may be discrete components within the display device 900, or may be incorporated within the processor 921 or other components.

The driver controller 929 may take the raw image information generated by the processor 921 either directly from the processor 921 or from the frame buffer 928 and may re-format the raw image information appropriately for high speed transmission to the array driver 922. In some implementations, the driver controller 929 may re-format the raw image information into a data flow having a raster-like format, such that it has a time order suitable for scanning across the display array 930. The driver controller 929 may send the formatted information to the array driver 922. Although a driver controller 929, such as an LCD controller, is often associated with the system processor 921 as a stand-alone integrated circuit (IC), such controllers may be implemented in many ways. For example, controllers may be embedded in the processor 921 as hardware, embedded in the processor 921 as software, or fully integrated in hardware with the array driver 922.

The array driver 922 may receive the formatted information from the driver controller 929 and may re-format the video data into a parallel set of waveforms that are applied many times per second to the hundreds, and sometimes thousands (or more), of leads coming from the display's x-y matrix of display elements.

In some implementations, the driver controller 929, the array driver 922, and the display array 930 are appropriate for any of the types of displays described herein. For example, the driver controller 929 may be a conventional display controller or a bi-stable display controller (such as an IMOD display element controller). Additionally, the array driver 922 may be a conventional driver or a bi-stable display driver. Moreover, the display array 930 may be a conventional display array or a bi-stable display. In some implementations, the driver controller 929 may be integrated with the array driver 922. Such an implementation may be useful in highly integrated systems, for example, mobile phones, portable electronic devices, watches or small-area displays.

In some implementations, the input device 948 may be capable of allowing, for example, a user to control the operation of the display device 900. The input device 948 may include a keypad, such as a QWERTY keyboard or a telephone keypad, a button, a switch, a rocker, a touch-sensitive screen, a touch-sensitive screen integrated with the display array 930, a pressure- or heat-sensitive membrane, an ultrasonic fingerprint sensor, an ultrasonic touchpad, or an ultrasonic touchscreen. The microphone 946 may be capable of functioning as an input device for the display device 900. In some implementations, voice commands through the microphone 946 may be used for controlling operations of the display device 900.

The power supply 950 may include a variety of energy storage devices. For example, the power supply 950 may be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery may be wirelessly chargeable. The power supply 950 also may be a renewable energy source, a capacitor, or a solar cell, including a plastic solar cell or solar-cell paint. The power supply 950 also may be capable of receiving power from a wall outlet.

In some implementations, control programmability may reside in the driver controller 929, which may be located in several places in the electronic display system. In some implementations, control programmability may reside in the array driver 922. The above-described optimization may be implemented in any number of hardware and/or software components and in various configurations.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Although the present disclosure has been described with respect to one or more particular implementations, it will be understood that other implementations of the present disclosure may be made without departing from the spirit and scope of the present disclosure. Hence, the present disclosure is deemed limited only by the appended claims and the reasonable interpretation thereof.

What is claimed is:

1. A method of determining whether a biometric object is part of a live individual, comprising:
    acquiring image information from the biometric object using an ultrasonic sensor, wherein acquiring the image information involves a plurality of range gate delays and a plurality of ultrasonic frequencies; and
    analyzing the image information in at least two analysis stages, wherein one of the analysis stages is a temporal analysis stage that analyzes changes in the image information obtained during a time period throughout which the biometric object was continuously available to the sensor and the other of the analysis stages involves analyzing the image information to determine whether the biometric object includes at least one manufactured layer.

2. The method of claim 1, wherein the temporal analysis stage determines whether changes in the image information are similar to changes consistent with a live object.

3. The method of claim 1, wherein the temporal analysis stage involves determining whether a feature of the biometric object changed during the time period.

4. The method of claim 3, wherein the feature is selected from the group consisting of a pore opening size, a pore depth, a ridge pattern, and a texture.

5. The method of claim 1, wherein
    the other of the analysis stages analyzes the image information to determine whether the biometric object is three-dimensional.

6. The method of claim 5, wherein determining whether the biometric object is three-dimensional includes determining whether patterns of the biometric object are uniform.

7. The method of claim 6, wherein a Sobel filter is used to determine whether patterns of the biometric object are uniform.

8. The method of claim 5, further comprising concluding that the biometric object is part of a live individual if:
    (i) the temporal analysis stage indicates changes in the image information are similar to changes consistent with a live object; and (ii) the other of the analysis stages indicates that the object is three-dimensional.

9. The method of claim 1, wherein
the other of the analysis stages analyzes the image information to determine whether pattern types in the image information are among predetermined pattern types.

10. The method of claim 9, wherein determining whether pattern types in the image information are among predetermined pattern types includes identifying pattern classifications presented in the image information, and then determining whether the pattern classifications are among predetermined pattern classifications.

11. The method of claim 10, wherein identifying pattern classifications includes identifying whether patterns of the biometric object exhibit ridge flow.

12. The method of claim 9, further comprising concluding that the biometric object is part of a live individual if:
(i) the temporal analysis stage indicates that a feature of the biometric object changed during the time period; and
(ii) the other of the analysis stages indicates that the pattern types in the image information are among predetermined pattern types.

13. The method of claim 1, wherein determining whether the object includes at least one manufactured layer includes assessing image quality of the image information.

14. The method of claim 1, further comprising concluding that the biometric object is part of a live individual if:
(i) the temporal analysis stage indicates that a feature of the biometric object changed during the time period; and
(ii) the other of the analysis stages indicates that the biometric object does not include at least one manufactured layer.

15. The method of claim 1, wherein the ultrasonic sensor includes a platen on which the biometric object is placed.

16. The method of claim 1, further comprising providing a liveness output signal based on the analyzed image information.

17. A non-transitory computer readable medium storing computer executable code, the executable code comprising instructions to:

acquire image information from the biometric object using an ultrasonic sensor, wherein acquiring the image information involves a plurality of range gate delays and a plurality of ultrasonic frequencies; and analyze the image information in at least two analysis stages, wherein one of the analysis stages is a temporal analysis stage that analyzes changes in the image information obtained during a time period throughout which the biometric object was continuously available to the sensor and the other of the analysis stages involves analyzing the image information to determine whether the biometric object includes at least one manufactured layer.

18. The medium of claim 17, wherein determining whether the object includes at least one manufactured layer includes assessing image quality of the image information.

19. The medium of claim 17, wherein the executable code comprises instructions to determine whether
pattern types in the image information are among predetermined pattern types.

20. A system for determining whether a biometric object is part of a live individual, comprising:
an ultrasonic sensor configured to acquire image information from the biometric object using a plurality of range gate delays and a plurality of ultrasonic frequencies;
a processor configured to analyze the image information in at least two analysis stages, wherein one of the analysis stages is a temporal analysis stage that analyzes changes in the image information acquired during a time period throughout which the biometric object was continuously available to the sensor and the other of the analysis stages involves analyzing the image information to determine whether the biometric object includes at least one manufactured layer.

21. The system of claim 20, wherein the processor is further configured to determine whether pattern types in the image information are among predetermined pattern types.

22. The system of claim 20, wherein the processor is further configured to determine image quality of the image information.

* * * * *